(12) United States Patent
Teoh et al.

(10) Patent No.: US 11,074,439 B2
(45) Date of Patent: Jul. 27, 2021

(54) SYSTEM AND METHOD FOR DETECTING, MONITORING AND IDENTIFYING HUMAN BEINGS

(71) Applicant: DREAMCORE TECHNOLOGIES SDN BHD, Penang (MY)

(72) Inventors: Chin Soon Teoh, Penang (MY); Grant A. Ellis, Seattle, WA (US)

(73) Assignee: DREAMCORE TECHNOLOGIES SDN BHD, Penang (MY)

( * ) Notice: Subject to any disclaimer, the term of this patent is extended or adjusted under 35 U.S.C. 154(b) by 22 days.

(21) Appl. No.: 16/242,811

(22) Filed: Jan. 8, 2019

(65) Prior Publication Data
US 2020/0202118 A1 Jun. 25, 2020

(30) Foreign Application Priority Data
Dec. 21, 2018 (MY) .......................... PI 2018002845

(51) Int. Cl.
*G06K 9/00* (2006.01)
*G06N 20/00* (2019.01)

(52) U.S. Cl.
CPC ....... *G06K 9/00369* (2013.01); *G06K 9/0055* (2013.01); *G06N 20/00* (2019.01)

(58) Field of Classification Search
CPC ............. G06K 9/00369; G06K 9/0055; G06K 7/0008; G06K 19/0723; G06N 20/00; H04L 67/04; H04L 67/12; H01Q 1/2216
See application file for complete search history.

(56) References Cited

U.S. PATENT DOCUMENTS

| | | | |
|---|---|---|---|
| 2016/0377705 A1* | 12/2016 | Zack | G01S 7/414 342/21 |
| 2017/0085112 A1* | 3/2017 | Leabman | H02J 50/60 |
| 2017/0212210 A1* | 7/2017 | Chen | G01S 5/06 |
| 2019/0037350 A1* | 1/2019 | Prevatt | H01Q 1/246 |

* cited by examiner

*Primary Examiner* — Orlando Bousono
(74) *Attorney, Agent, or Firm* — JCIP; Joseph G. Chu; Jeremy I. Maynard

(57) ABSTRACT

A human identifier system capable of distinguishing between multiple known people includes a first antenna and a second antenna. Particularly, the second antenna is operably selects the distance between to allow multiple people to walk, run or move between the antenna pairs. Additionally, the system also includes a radio frequency transmitter for generating multiple radio signals and a radio frequency receiver for receiving the transmitted radio signals. The system also includes a data processor operably connected to the radio frequency receiver with a processing means for processing the received signals from radio frequency receiver to provide output signals to identify a person walking, running or moving between the first antenna and the second antenna.

10 Claims, 35 Drawing Sheets

SYSTEM AND METHOD FOR DETECTING, MONITORING AND IDENTIFYING HUMAN BEINGS

PRIORITY

The present application claims priority under 35 U.S.C. 119(a)-(d) to Malaysian patent application number PI 2018002845, having a filing date of Dec. 21, 2018, the disclosure of which is hereby incorporated by reference in its entirety.

FIELD OF THE INVENTION

Embodiments of the present invention pertains to system and method for detecting, monitoring and identifying human beings walking, running or moving through a passageway, a walkway or a doorway using radio frequency technology and identification algorithms. In particular, for detecting one or more human beings while entering or leaving an enclosed area such as a room, building or campus.

BACKGROUND OF THE INVENTION

Traditionally, various methods and systems have been used to detect human beings in a surveillance based environment. In various applications where supervision is needed, the monitoring equipment utilized mainly consists of detection through the use of thermal and visual information sources, video cameras and various optical, mechanical or electrical switches, sensors or alarm systems designed to detect movements or other effects produced by an object moving in the area watched over.

In operation, the methods for detecting and counting the passing of an object are further processed in order to verify the presence of humans and their identity using facial information obtained from their thermal and visual spectra. Moreover, facial detection is used to verify the presence of humans, and facial recognition techniques are used to identify them. Furthermore, passive-infrared-proximity-motion sensors are used to sense motion and to detect whether a human has moved from a position which is in or out of the sensor's range.

Generally, global enterprise networks of electronic surveillance allow detection of a marker or a tag within a given detection region, identifying people and their tastes instantly and is used for customized advertisements using identification algorithms from the big data generated.

The ability to detect and identify people and monitor people's activity has many uses in the current Industry 4.0 era. The need of the hour is to control terrorism which includes homeland security, monitoring movement of employees and school children which are of major importance in the Industry 4.0 era. Another equally important use of the surveillance technology is in law enforcement including police enforcement and management of correctional institutions for detecting and monitoring offenders through monitoring a controlled perimeter which is identified by the surveillance authorities.

With the advent of new radio frequency technologies, the public is becoming increasingly exposed to the intrusive uses of radio frequency tags in the workplace, while at home, shopping, talking on their cell phone, driving in their car and in their everyday life. In recent times, large numbers of corporate and retail giants are using the radio frequency tags in their products, garments, fashion apparel, household items, internet things, consumer products, pharmaceutical goods, packaging, labeling, merchandise, automobiles, cell phones, etc. A track of consumer's every move by government agencies and third parties result in the loss of privacy, loss of control, and the invisibility of this technology.

A limitation with visual inspection method is that the person or persons under observation can hide or otherwise obscure their appearance using a mask or otherwise look away from cameras and thereby avoid identification. Another limitation of visual inspection is that it is invasive of personal privacy.

Audio recording devices are similarly invasive of personal privacy. Many people prefer to be anonymous to surveillance systems. Accordingly, the present invention allows known or unknown persons to be monitored while still being non-invasive of privacy.

Thus, there remains a need in the art for method and a device to detect, identify people and monitor their activities. Building and especially maintaining a monitoring system is expensive. Moreover, different individual alarm switches are often relatively easy to evade or to make inoperative. Henceforth, there exists a need in the art for a method and device.

Accordingly, the present invention relates to the field of human detection and objective of the present invention is to eliminate the above-mentioned drawbacks. Moreover, the present invention relates to systems, methods and devices for detecting, monitoring and identifying of human beings using radio frequency technology and identification algorithms. Particularly, the present system includes a number of instructions executed by the system to capture a human body's electromagnetic signature and identify the electromagnetic signature as a human being, is walking, running or moving through a passageway, walkway or doorway. The present invention is able to provide information related to entry of the unknown person in an enclosed large surface area such as a room, building or campus.

SUMMARY OF THE INVENTION

Embodiments of the present disclosure relate to methods, systems, and devices for detecting, monitoring and identification of human beings using radio frequency technology. Particularly, the identification algorithms of the present invention is able to identify when one or more human beings walk, run or move through a passageway, walkway or doorway and enter or leave an enclosed area such as a room, building or campus. In one embodiment of the present invention, a human identifier system comprises a single sensor node operably connected to a data processor that is capable of distinguishing between multiple known people and unknown persons. The sensor node includes one antenna pair. Further, the first antenna of the pair is located a fixed distance from second antenna of the pair, with the distance between the first antenna and the second antenna being selected to allow a person to walk, run or move between them. Moreover, a radio frequency transmitter that is capable of generating multiple radio signals is connected to the first antenna. A radio frequency receiver that is capable of receiving the multiple radio signals is connected to the second antenna. The data processor is operably connected to the radio frequency receiver with a processing means for processing multiple received signals from the radio frequency receiver, in order to provide multiple output signals that identify a person walking, running or moving between the first and second antennas.

In another embodiment of the present invention, the human identifier system comprises multiple sensor nodes that are operably connected to a data processor that is capable of distinguishing between multiple known people and unknown persons. Moreover, each sensor node includes multiple antenna pairs, with the first antennas of the pairs forming a first array, and the second antennas of the pairs forming a second array. In operation, the second array is substantially parallel to the first array. The first antenna is located a fixed distance from second antenna, with the distance between the first antenna and the second antenna being selected to allow a person to walk or run between them. In addition the spacing between the antennas in each array is selected to capture the different phases of a person's walking or running gait cycle. Moreover, a radio frequency transmitter that is capable of generating multiple radio signals is connected through a first configuring means to at least one antenna of the first array. A radio frequency receiver that is capable of receiving the multiple radio signals is connected through a second configuring means to at least one antenna of the second array. Moreover, the first configuring means and second configuring means are any one of a switching means, a combining means, a splitting means, a through-line and alike. The data processor is operably connected to the radio frequency receiver of each sensor node and has a processing means for processing multiple received signals from the radio frequency receiver, in order to provide multiple output signals that identify a person walking, running or moving between the first and second antennas.

In accordance with various embodiments of the present invention, the data processor is operably connected to the radio frequency receiver with a processing means for processing multiple received signals from the radio frequency receiver. Particularly, the radio frequency receiver provides multiple output signals that are used to identify a person walking, running or moving between the first antenna and the second antenna of one or more antenna pairs.

The foregoing objectives of the present invention are attained by employing and incorporating a method for identifying humans in any scenario. In operation, the present invention distinguishes between multiple known people by means of the data processor. The data processor is able to record the received signals when an unknown person walks, runs or moves between the first antenna and the second antenna. The present invention uses an identification algorithm to compare the received signals with known signatures in a database at one or more frequencies and thereby identify the unknown people.

In accordance with another object of the present invention, the method for identifying humans and a system capable of distinguishing between multiple known people includes the steps of measuring signature of body movement as a time series. Particularly, the time series is measured at multiple frequencies from $f_1$ to $f_N$.

The time series measured at multiple frequencies are of the people passing through the system. Further, the system and method is able to detect the body movements of the people passing through the system. This process in turn normalizes the magnitude of multiple signatures of the body movements of a detected person passing through the system. Furthermore, each value of the signature time series is divided by an ambient or quiescent value when no human is passing through the system.

Every signature $(f_1-f_N)$ is arranged into a single array to form and generate a dataframe. The multiple signatures are aligned to start and stop at the same time with respect to a reference data frame. Aligning the minimum value in a $f_1$ signature is used as a reference to align all the generated dataframes. Furthermore, aligning minimum value in a $f_1$ signature is used to receive normalized and time-aligned dataframe and store the dataframe in a database. The signature that corresponds to a lowest frequency $f_1$ has slowest variation.

These dataframes are processed by the data processor using an identification algorithm to compare the received signals with known signatures in the database at one or more frequencies and thereby identify the unknown people. The identification algorithms either include a set of instructions to compute a covariance matrix, or is a machine learning algorithm which includes any one of these: an artificial neural network, logistic regression, or support vector classifier.

BRIEF DESCRIPTION OF THE DRAWINGS

So that the manner in which the above recited features of the present invention is to be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention relates to system and method for detecting, monitoring and identifying human beings using radio frequency technology and identification algorithms. Particularly, the human beings are monitored as they walk, run or move through a passageway, a walkway or a doorway and enter or leave an enclosed area such as a room, building or campus. Moreover, the present invention relates to the method for detecting, monitoring and identification of unknown people and known people entering or leaving large rooms or enclosed areas such as those located in factories, schools, shopping malls, conference areas, residential areas, campuses and other public and private places. Furthermore the method uses multiple interrogating signals such as microwave or radio-frequency (RF) radiation, or acoustic broadcasting. The principle of the present invention and their advantages are best understood by referring to FIG. 1 to FIG. 10B. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Various embodiments of the present invention provide method for the detection, monitoring and identification of human beings using radio frequency technology. The present invention is aimed to focus on identification algorithms for identifying human beings, persons, subjects and the like. More specifically, the present invention includes capturing human beings through radio frequency as they walk, run or move through a passageway, walkway or doorway and enter or leave an enclosed area such as a room, building or campus. Subsequently, the presence of a human is verified using electromagnetic signature detection. Particularly, electromagnetic signature techniques are used to identify presence of human beings, persons, subjects and the like. Moreover, the present invention also utilizes interrogating signals such as microwave or radio-frequency (RF) radiation, acoustic broadcasting and the like for identifying, monitoring and identification of human beings, persons, people, subjects and the like.

Figure 1:
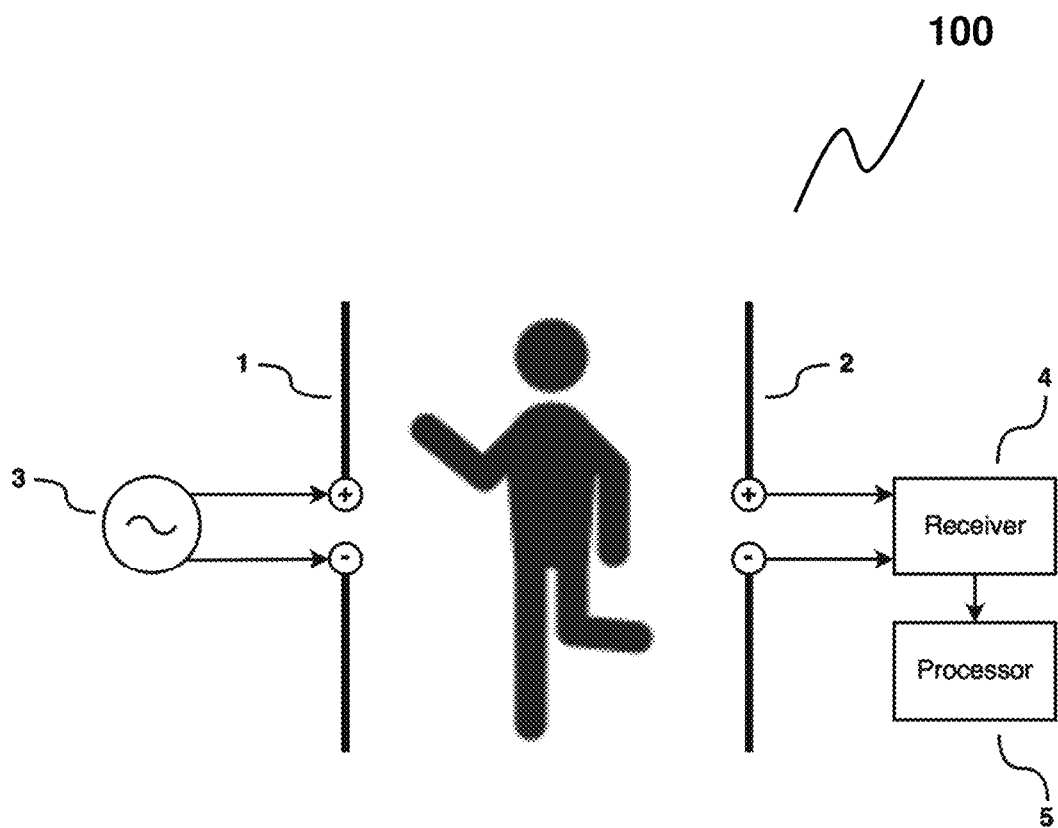
FIG. 1 illustrates a block diagram of schematic configuration of multiple functions of a stand-alone human detector system and device within which various aspects of the disclosure is to be implemented, according to one embodiment of the present invention.

FIG. 1 illustrates a block diagram of a stand-alone human detector system 100 within which various aspects of the disclosure is to be implemented, according to one or more embodiments of the present invention. With reference now to the Figs, particularly like reference numbers denote parts. FIG. 1 illustrates a human detection system 100 includes one transmit antenna 1, one receive antenna 2, a radio transmitter 3, a radio receiver 4, a data processor 5 and a communication network (not shown) to communicate between the components of the system 100. As illustrated therein, various embodiments of the present invention may be embodied for detection, monitoring and identification of human beings using radio frequency technology as they walk, run or move through a passageway, walkway. In addition, certain embodiments may further be embodied for identification algorithms as they walk, run or move through a passageway or walkway in accordance with an embodiment of the present invention, the system 100. Particularly, the radio transmitter 3 is connected to the transmit antenna 1. The radio receiver 4 is connected to the receive antenna 2. Furthermore, the transmit antenna 1 and receive antenna 2 are located in a hallway, walkway or some other passageway at a fixed distance from each other.

In accordance with one embodiment of the present invention, the distance between the transmit antenna 1 and receive antenna 2 is fixed at a distance large enough to allow the detection and identification of one single person who is walking or moving in between transmit antenna 1 and receive antenna 2. The action of moving between the antennas includes walking, running, or rolling such as in the case of being in a wheelchair, escalator and the like. In addition, there is an arrangement for detection of unknown person and/or people who are stationary and the human detector system is moving.

In accordance with another embodiment of the present invention, the transmit antenna 1 and receive antenna 2 are located at a greater distance to allow one or more persons to pass through simultaneously. Particularly, the receiver antenna 2 receives electromagnetic signals transmitted from the transmit antenna 1 using the receiver 4. Furthermore, the signals transmitted by the transmitter 3 are having frequency in anyone of the frequency selected from single frequency and multiple frequencies. In operation, the signals transmitted by the transmitter 3 are in continuous time domain sinusoidal or pulsed signals, which the receiver 4 is configured to receive.

Furthermore, the above-mentioned literature further discloses system 100 in which human sensing units have the transmit power levels in the range of 1 nW to 20 mW, or −60 to +13 dBm. The human sensing units have the received electromagnetic signal at the receiver which is in the form of magnitude and phase, or magnitude only. Particularly, the control signals from the data processor 5 synchronize transmitter 3 and receiver 4 frequencies such that they operate the same frequencies at the same time. Further, the receiver architecture is any one of a heterodyne or direct conversion type, and is tunable to different frequency bands and ranges. In operation, the receiver 4 has sensitivity in the range of −130 to −95 dBm. The data processor 5 is connected to the receiver 4. In operation, the data processor 5 records changes in the received signals due to the electromagnetic scattering caused by one or more persons walking, running or moving close to either antenna or between the transmit antenna 1 and the receive antenna 2. Moreover, the electromagnetic scattering includes diffraction, reflection, transmission, and other electromagnetic effects caused by people walking, running or moving near either antenna or in-between them.

In the procedure of the present invention, the stand-alone human detection system 100 of FIG. 1, the data processor 5 also processes signals received by the receiver 4. The data processor 5 determines and identifies one or more new and unknown persons walking, running or moving near or in-between the antennas by using an algorithm. Particularly, the system 100 includes a database 39 (shown in FIG. 10A) for storing the signatures 600. In the present invention, the data processor 5 requires the received data to be in a discrete or digitized form, so that the data is processed using a data processing algorithm. Further, the receiver 4 or the data processor 5 converts the received signals into a discrete or digital form using an analog to digital (A/D) converter. Furthermore, the A/D converter is a series or parallel type and has a resolution typically in the range of about 6 to 16 bits. The sample rate is typically from 100 Hz to 20 kHz.

Furthermore, the data processor 5 processes the data received from the receiver 4 which includes the steps of organizing the data into signatures or dataframes 24 and subsequently storing the dataframes 24 into the database 39. Particularly, the identification algorithm is implemented for identifying the unknown person. The processor 5 continually monitors the output of the receiver 4. For example, when a significant change of 10% in the output of the receiver 4 is detected, then the processor 5 begins to record the signatures from the unknown person within an appropriate time-window and process them accordingly.

Figure 2A:
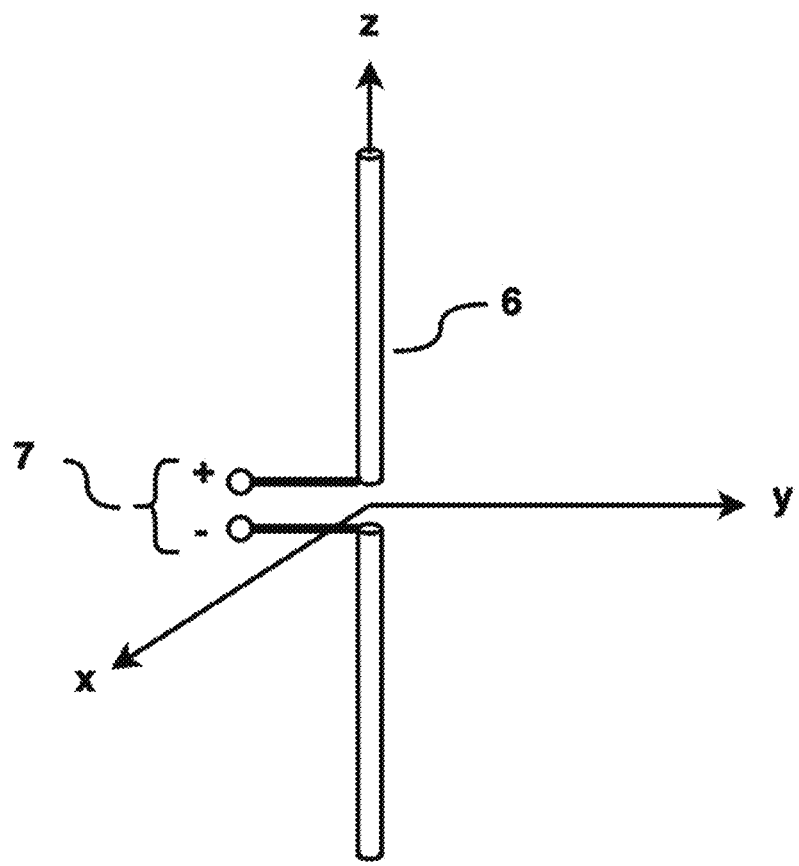
FIG. 2A illustrates a pictorial representation of a dipole antenna X, Y, Z through which the stand-alone human detector detects and identifies activities of human beings, according to one or more embodiments of the present invention.

Particularly, the first antenna is located a fixed distance from second antenna and second antenna operably selects the distance between the first antenna and the second antenna to allow the multiple people to walk, run or move between the first antenna and the second antenna. Moreover, the radio frequency transmitters 3 are capable of generating multiple radio signals with a switching means for selecting between any of the first antenna from the first array. Henceforth, one or more radio frequency receivers 4 are capable of receiving the multiple radio signals with a switching means for selecting between any of the second antenna from the second array. In yet another embodiment, first antenna forms a first array, and second antenna forms a second array. Moreover, the central processing unit is operably connected to multiple sensor nodes. And, each sensor node of multiple sensor nodes includes two or more antenna pairs which form a first array and a second array. Henceforth, each sensor node is an independent node in a sensor network that is capable of performing processing, gathering sensory information and communicating with other connected nodes in the network. Subsequently, a first configuring means connects at least one antenna of the first array to the transmitter 3 and a second configuring means connects at least one antenna of the second array to the receiver 4. Moreover, the first configuring means and second configuring means is any one of a switching means, a combining means, a splitting means and the like. In one embodiment the configuring means is a through-line for single antenna pairs FIG. 2A depicts the dipole antenna 6 through which stand-alone human detector detect and identifies activities of human beings, according to one or more embodiments of the present invention. Particularly, the antenna 1 and 2 are dipoles. The radio frequency signals are coupled into and out of the dipole at the feed points 7 of the antenna 1 and 2.

Moreover, in the present embodiment of the present invention, the dipole antenna length is about 1.8 meters. Further, the size of an average person affects the change in the radiated electric fields having both vertical or z-component and a lateral or y-component. Particularly, the present method provides selective supervision of the entire area to be monitored having two electric field components present in the antenna pattern. The present method also improves the detection ability of the system as the person walks, runs or moves in the vicinity of the antennas.

Moreover, the antenna dimensions are selected in order to maximize the variation in the received signals due to one or more persons walking, running or moving near them. Subsequently, large ranges of frequencies are used to capture the body movements of arms, legs, and torso. Particularly, at lower frequencies, electromagnetic fields have longer wavelengths and the resulting scattering is predominantly due to the resonance with the entire length of the body. However, at higher frequencies, the electromagnetic waves have a shorter wavelength and tend to resonate more with smaller body appendages like the arms and legs. Particularly, by interrogating the body with electromagnetic waves using multiple frequencies over a broad frequency range, the scattered electromagnetic fields due to the dynamics from the motion of the human body are captured.

Figure 2B:
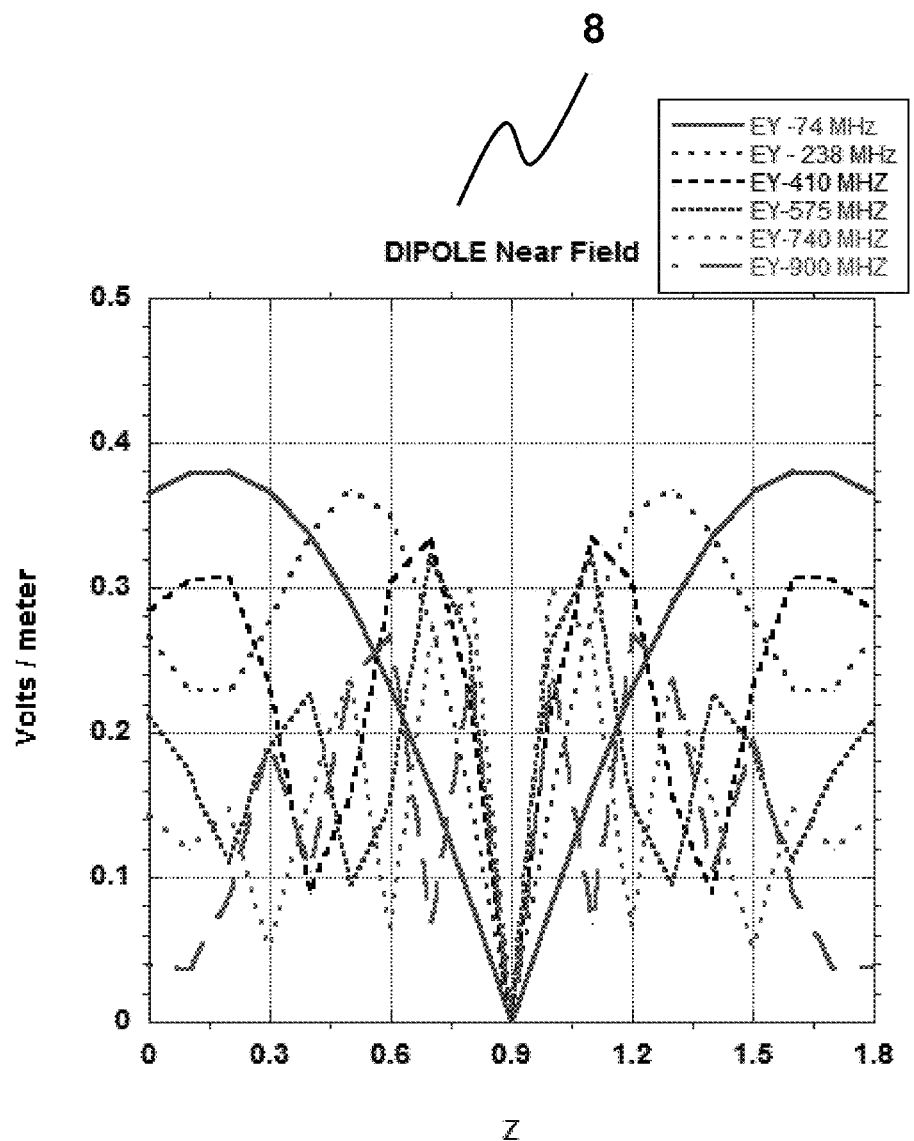
FIG. 2B is a graphical pictorial snapshot illustrating the dipole antenna's $E_y$ near electromagnetic fields having electric field intensity in the lateral or y-direction, according to one or more embodiments of the present invention.

FIG. 2B depicts a graphical pictorial snapshot of the dipole $E_y$ 8 near electromagnetic fields, according to one embodiment of the present invention. Particularly, $E_y$ is the electric field intensity in the lateral or y-direction. Results show the $E_y$ 8 electromagnetic fields at several frequencies. Furthermore, the magnitudes of the electromagnetic fields in the lateral direction are about the same. In particular, the graphical pictorial snapshot FIG. 2B illustrates the horizontal $E_y$ electric fields versus height z at 74, 238, 410, 575, 740, and 900 MHz located at a distance of y=0.8 meters from the dipole antenna 8. At each frequency, the magnitude of the field is equal to zero for height equal to z=0.9 meters and near maximum at the ends z=0 and z=1.8 meters. Furthermore, for detecting persons having short height, the $E_y$ electromagnetic fields would tend to interact more with one another to identify and detect human beings with short heights.

Figure 2C:
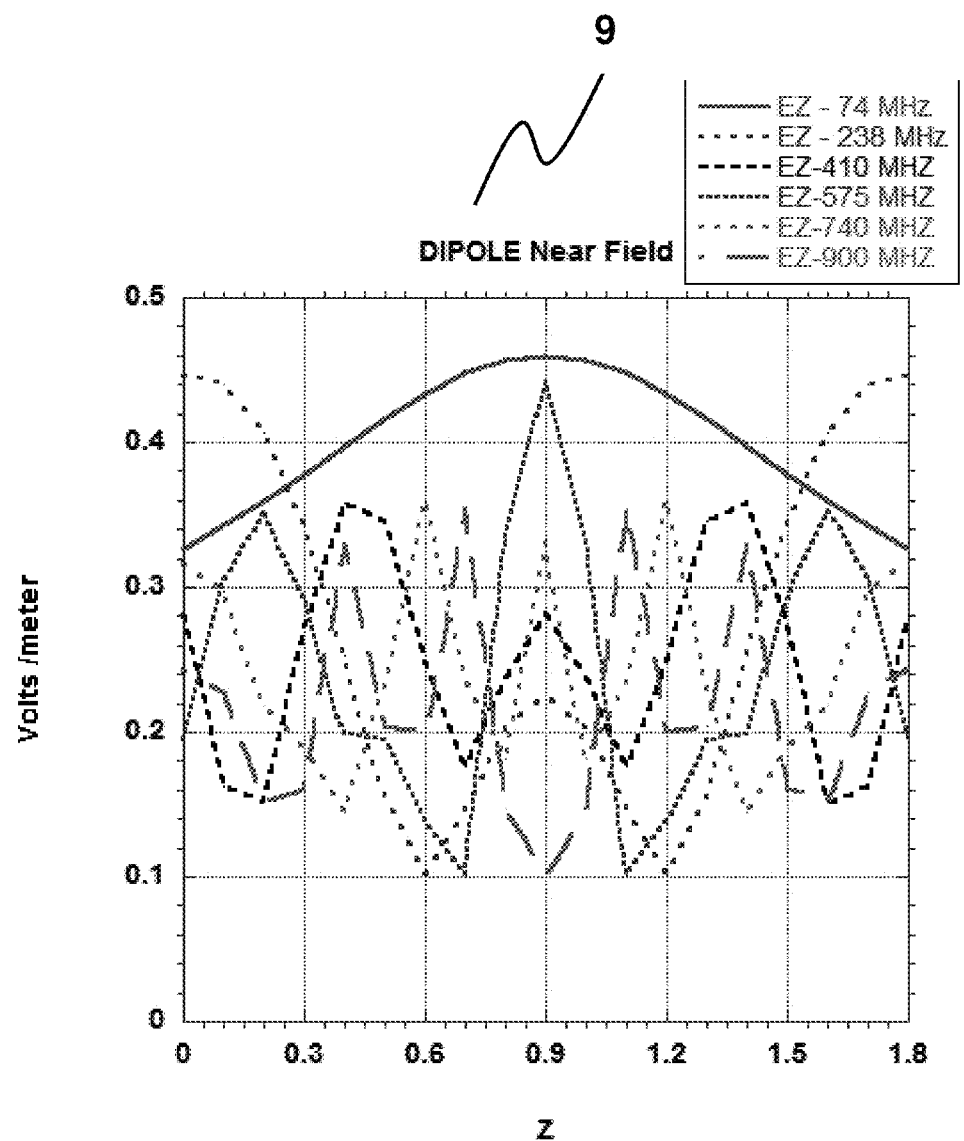
FIG. 2C is a graphical pictorial snapshot illustrating the dipole antenna's $E_z$ near electromagnetic fields having electric field intensity in the vertical direction or z-direction, according to one or more embodiments of the present invention.

FIG. 2C depicts graphical pictorial snapshot of the dipole $E_z$ 9 near electromagnetic fields, according to one embodiment of the present invention. $E_z$ is the electric field intensity in the vertical or z-direction. Results show the $E_z$ 9 electromagnetic fields at several frequencies. Furthermore, the magnitudes for these fields are about the same.

In particular, the graphical pictorial snapshot of FIG. 2C illustrates the vertical $E_z$ electric fields versus height z at 74, 238, 410, 575, 740, and 900 MHz located at a distance of y=0.8 meter from the dipole antenna 9. For a vertical z-oriented dipole, $E_x$=0 in the y-z plane (x=0). At each frequency, the magnitude of the field is maximum at a height equal to 0.9 meters. Furthermore, the $E_z$ fields would tend to interact more and identify and detect human beings with taller heights.

Figure 3A:
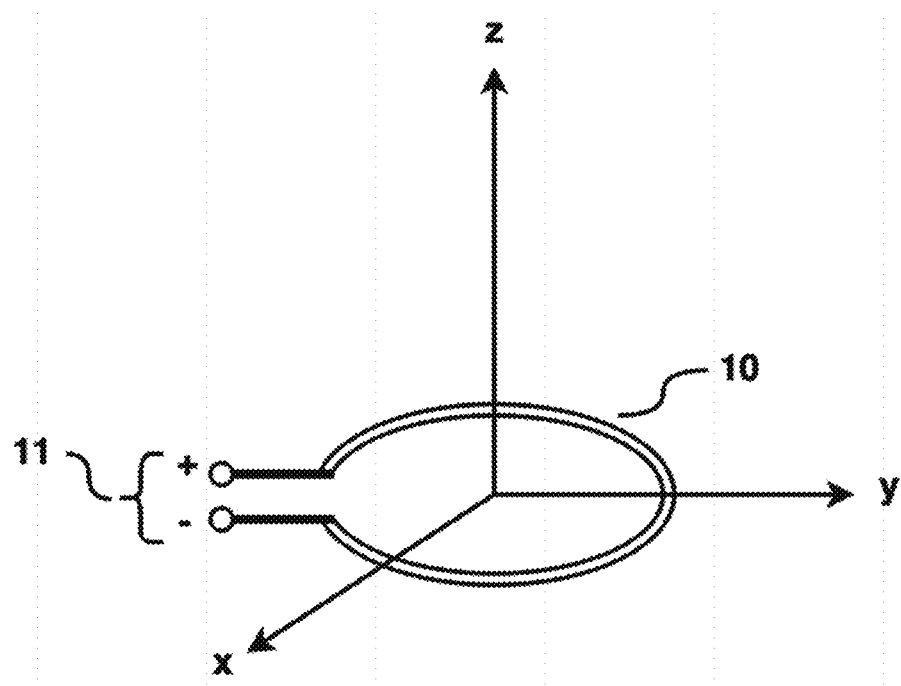
FIG. 3A is a pictorial representation illustrating the human detector system loop antenna for the transmitting and receiving antenna for capturing radio frequency signals, according to one or more embodiments of the present invention.

FIG. 3A is a pictorial representation illustrating the human detector system 100 loop antennas 10 for transmitting antenna 1 and receiving antenna 2 for capturing radio frequency signals. In operation with the human detector system 100, the loop antenna 10 transmits and receiving antenna 2 captures the radio frequency signals.

In accordance with another embodiment of the present invention, the transmit antenna 1 and receive antenna 2 are a loop antenna 10. Particularly, the loop 10 captures the radio frequency signals. The radio frequency signals are coupled into and out of the loop 10 at the feed point 11 of antenna 1 and antenna 2. Furthermore, in this embodiment, the loop antenna 10 is 0.6 meters in diameter and horizontally oriented in the x-y plane which is normal pointed in the z-direction. For a loop, $E_z$=0 in the plane of the loop.

Figure 3B:
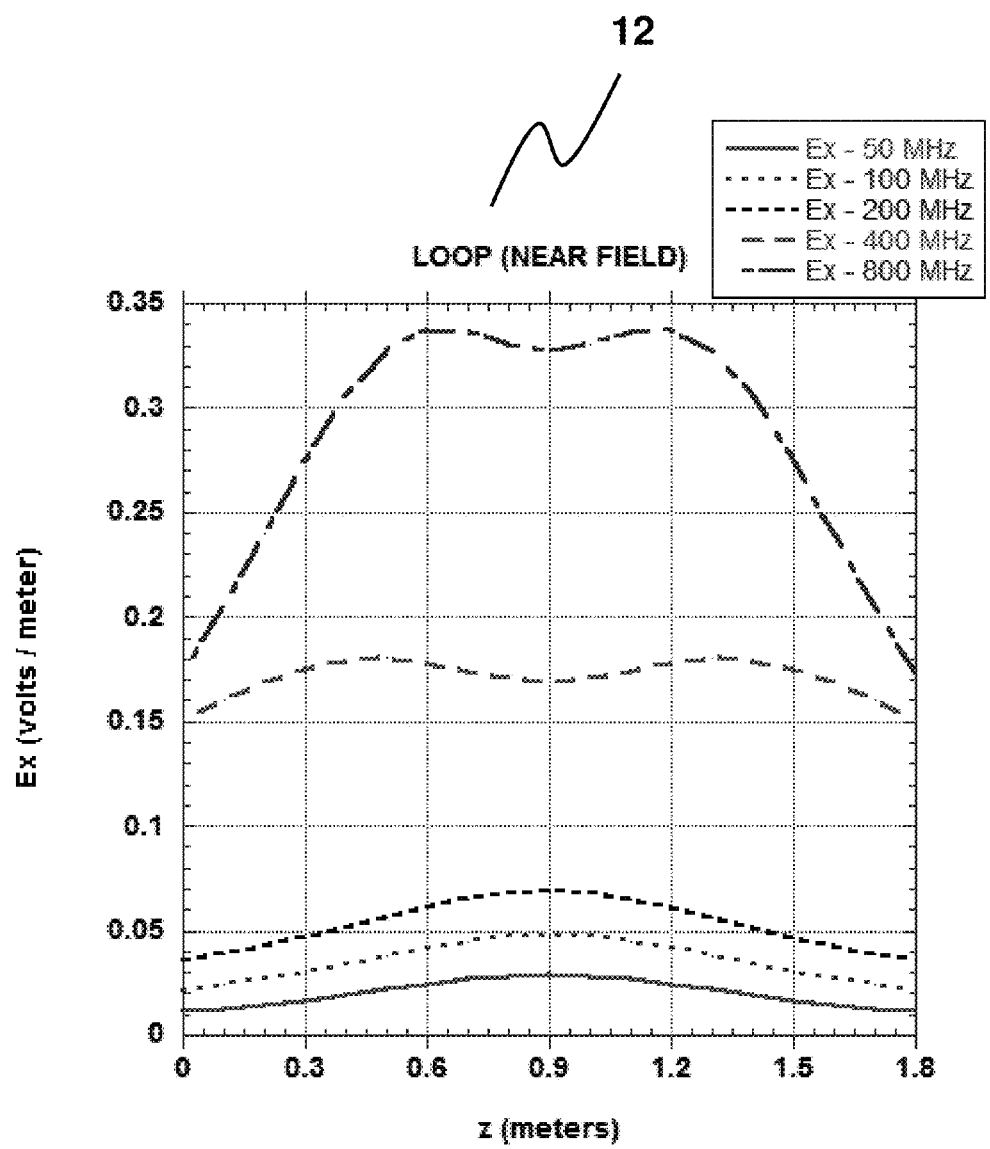
FIG. 3B is a graphical representation illustrating $E_x$ near electromagnetic field of the loop antenna for the transmitting and receiving antenna according to one embodiment of the present invention.
Figure 3C:
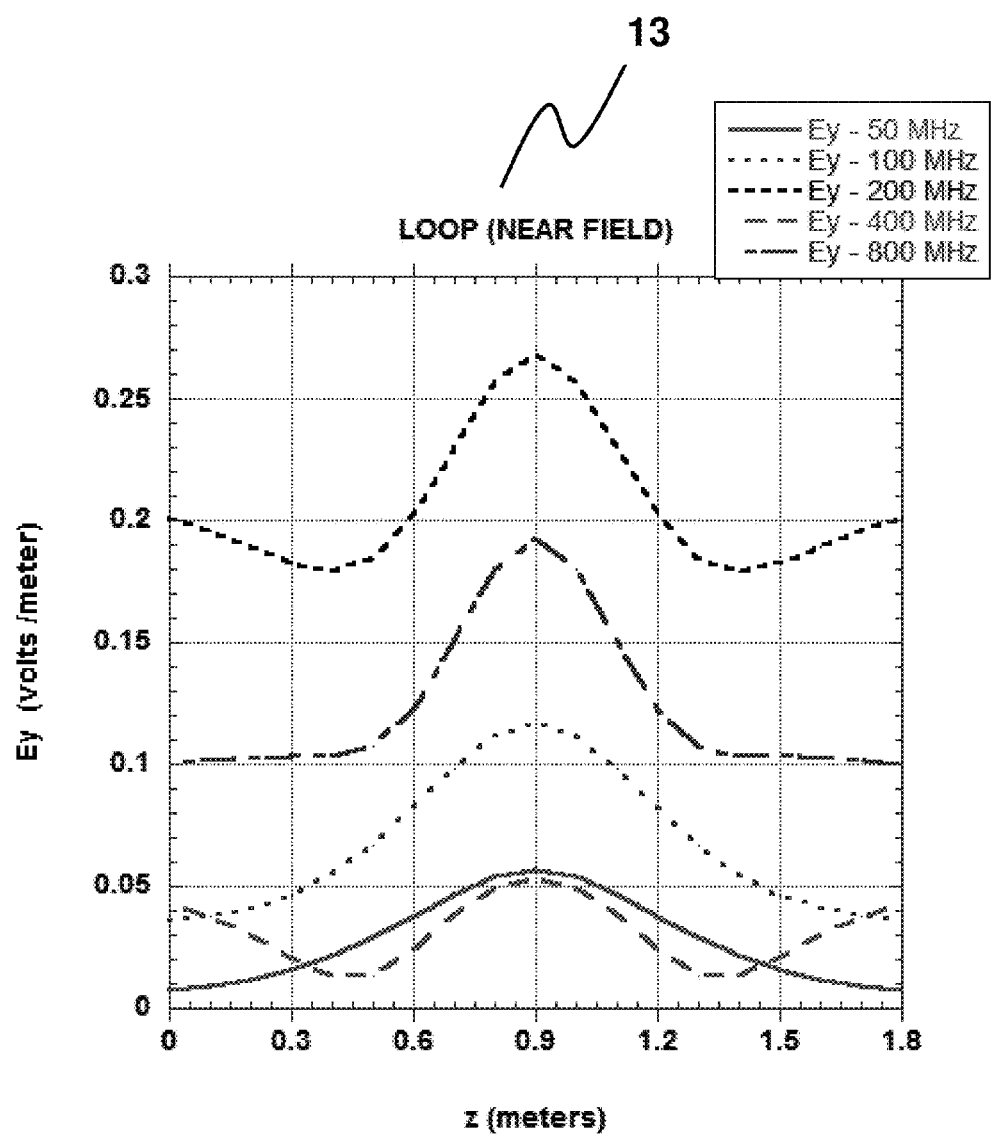
FIG. 3C is a graphical representation illustrating $E_y$ near electromagnetic field of the loop antenna for the transmitting and receiving antenna according to yet another embodiment of the present invention.
Figure 3D:
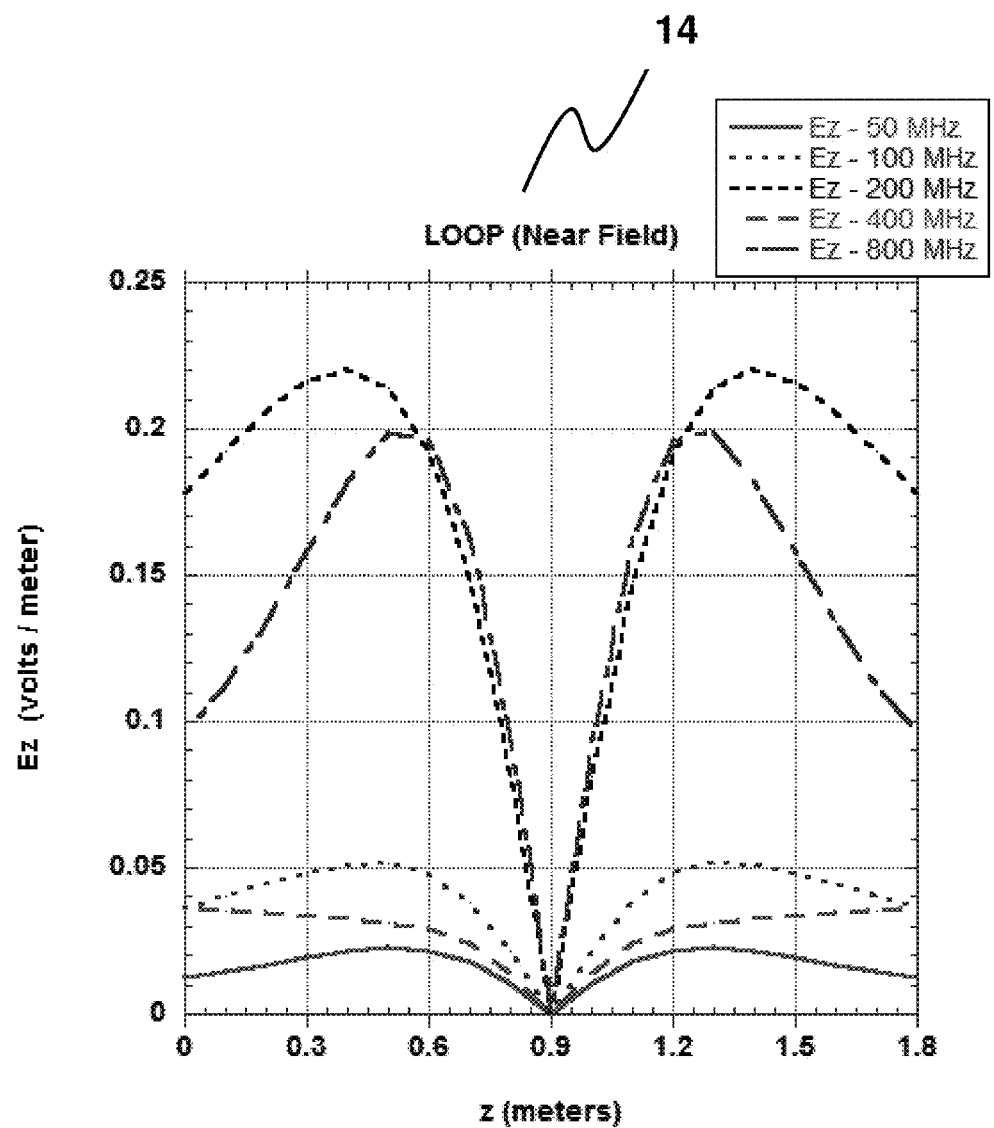
FIG. 3D is a graphical representation illustrating $E_z$ near electromagnetic field of the loop antenna for the transmitting and receiving antenna, according to yet another embodiment of the present invention.

FIG. 3B, FIG. 3C and FIG. 3D are graphical representations illustrating electromagnetic field of the human detector system loop antenna. As illustrated, FIG. 3B, FIG. 3C and FIG. 3D are the $E_x$ 12, $E_y$ 13 and $E_z$ 14 fields versus z depicted at y=0.8 meters.

Figure 4A:
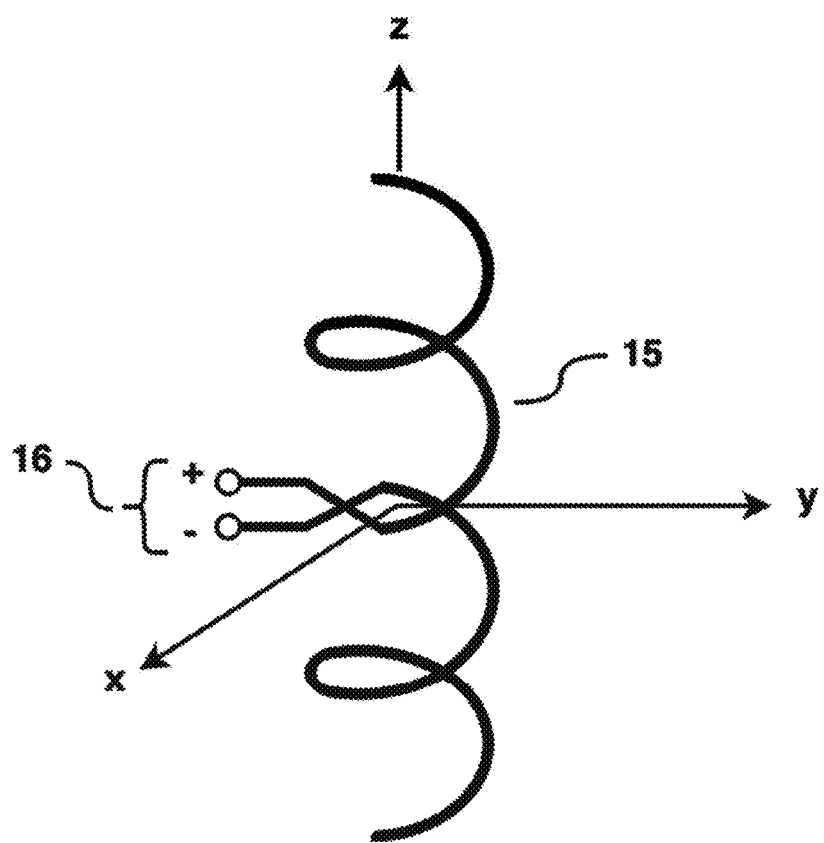
FIG. 4A is a pictorial representation illustrating the human detector system helix antenna for the transmitting and receiving antenna for capturing radio frequency signals, according to one or more embodiments of the present invention.

FIG. 4A is a pictorial representation illustrating the human detector system 100 helix antennas for the transmitting antenna 1 and receiving antenna 2 for capturing radio frequency signals, in accordance with yet another embodiment of the present invention.

In this embodiment of the present invention, the transmitting antenna 1 and receiving antenna 2 is a helix antenna 15. Particularly, the helix antenna 15 includes the elements of both the loop and dipole, as the helix includes several turns of coil oriented in the vertical, and z-direction. The radio frequency signals are coupled into and out of the helix at the feed point 16 of the helix antenna. Furthermore, in this embodiment, the helix antenna is 1.8 meters in height and is vertically oriented. The helix antenna also includes turns oriented in the horizontal x-y plane, which is distributed along the length of the antenna.

Figure 4B:
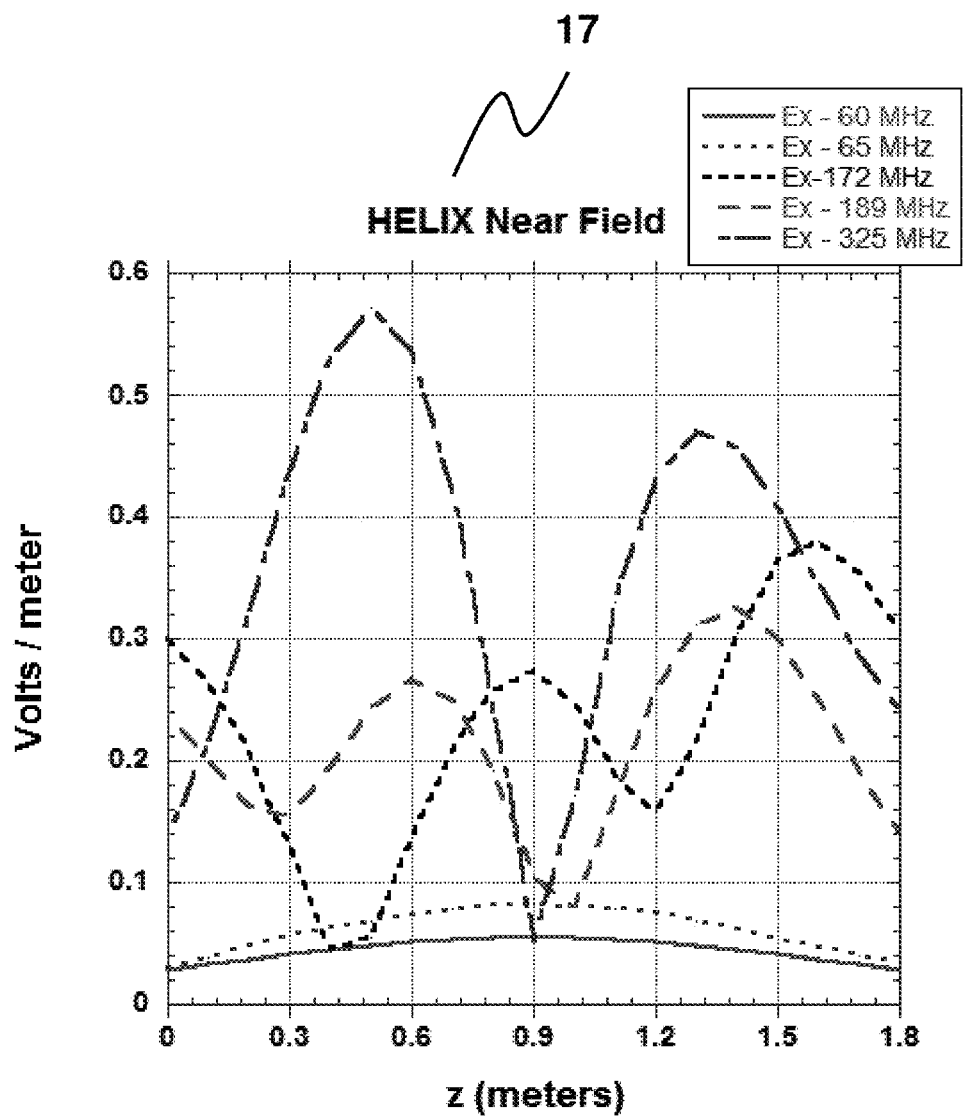
FIG. 4B is a graphical representation illustrating $E_X$ near electromagnetic field of the helix antenna for the transmitting and receiving antenna, according to one or more embodiments of the present invention.

FIG. 4B is a graphical representation illustrating $E_X$ near electromagnetic field of the helix antenna 15 for the transmitting antenna 1 and receiving antenna 2, according to one embodiment of the present invention. As illustrated in FIG. 4B the resulting electric fields include the x-polarization $E_x$ 17 similar to a loop. In this embodiment, the additional $E_x$ electric field component enables the helix antenna 15 to sense human body movements in all the three spatial axes that is an advantage over the dipole antenna. The dipole antenna 6 senses human body movements in only two spatial axes in the y-z plane (x=0). Conversely, the dipole has the advantage of being more physically compact than the helix. Illustrated in FIG. 4B are the horizontal $E_x$ electric fields of the helix antenna 15 versus height z at 60, 65, 172, 189, and 325 MHz located at a distance of y=0.8 meters from the axis of the helix 17. At each frequency, the magnitude of the field varies considerably.

Figure 4C:
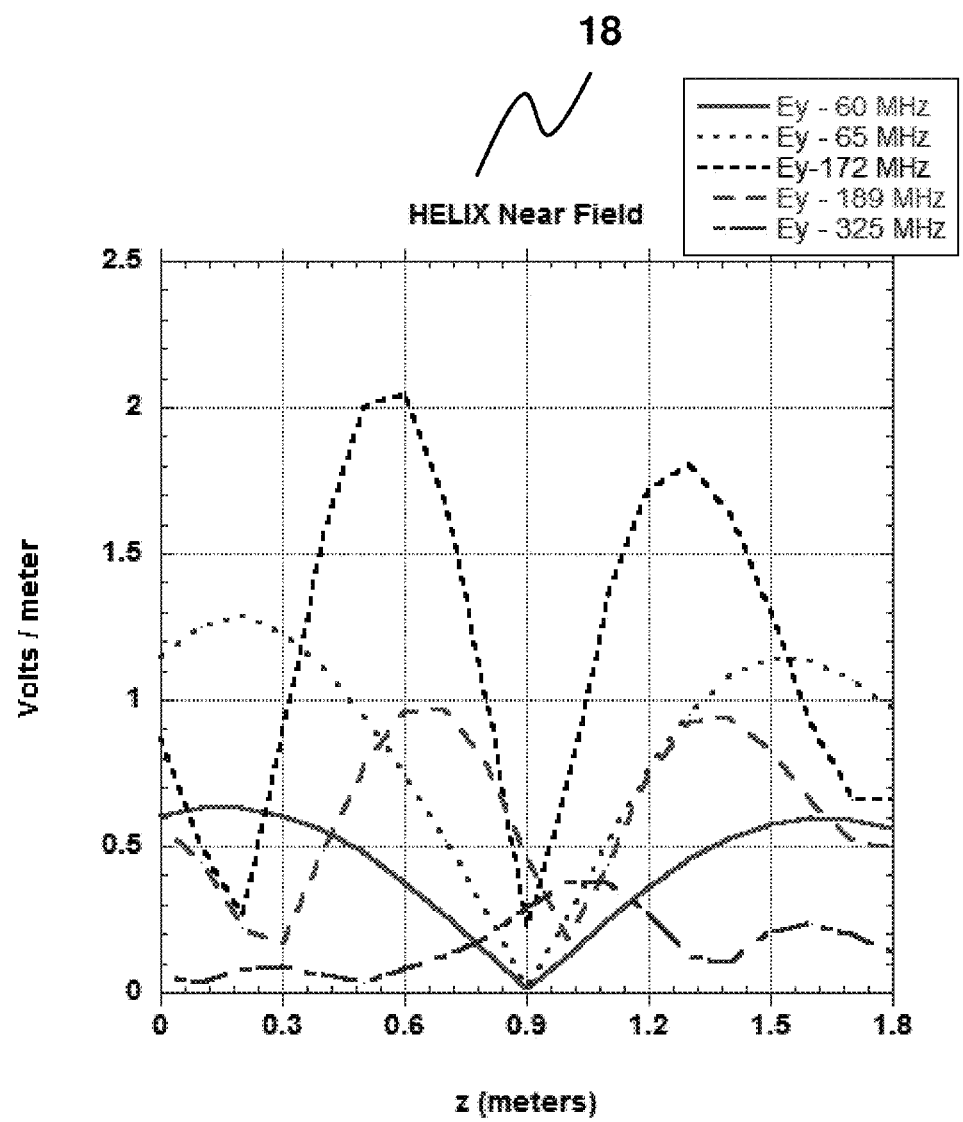
FIG. 4C is a graphical representation illustrating $E_Y$ near electromagnetic field of the helix antenna for the transmitting and receiving antenna, according to one or more embodiments of the present invention.

FIG. 4C is a graphical representation illustrating $E_Y$ 18 near electromagnetic field of the helix antenna 15 for the transmitting antenna 1 and receiving antenna 2, according to one or more embodiments of the present invention. In this embodiment, the $E_Y$ 18 electric field component enables the helix antenna 15 to sense human body movement in all the three spatial axes, that is an advantage over the dipole antenna 8, which senses in only two spatial axes i.e. in the x-z plane (y=0). Illustrated in FIG. 4C are horizontal $E_Y$ 18 electric fields of the helix antenna 15 versus height z at 60, 65, 172, 189, and 325 MHz located at a distance of y=0.8 meters from the axis of the helix 15. At each frequency, the magnitude of the field varies considerably.

Figure 4D:
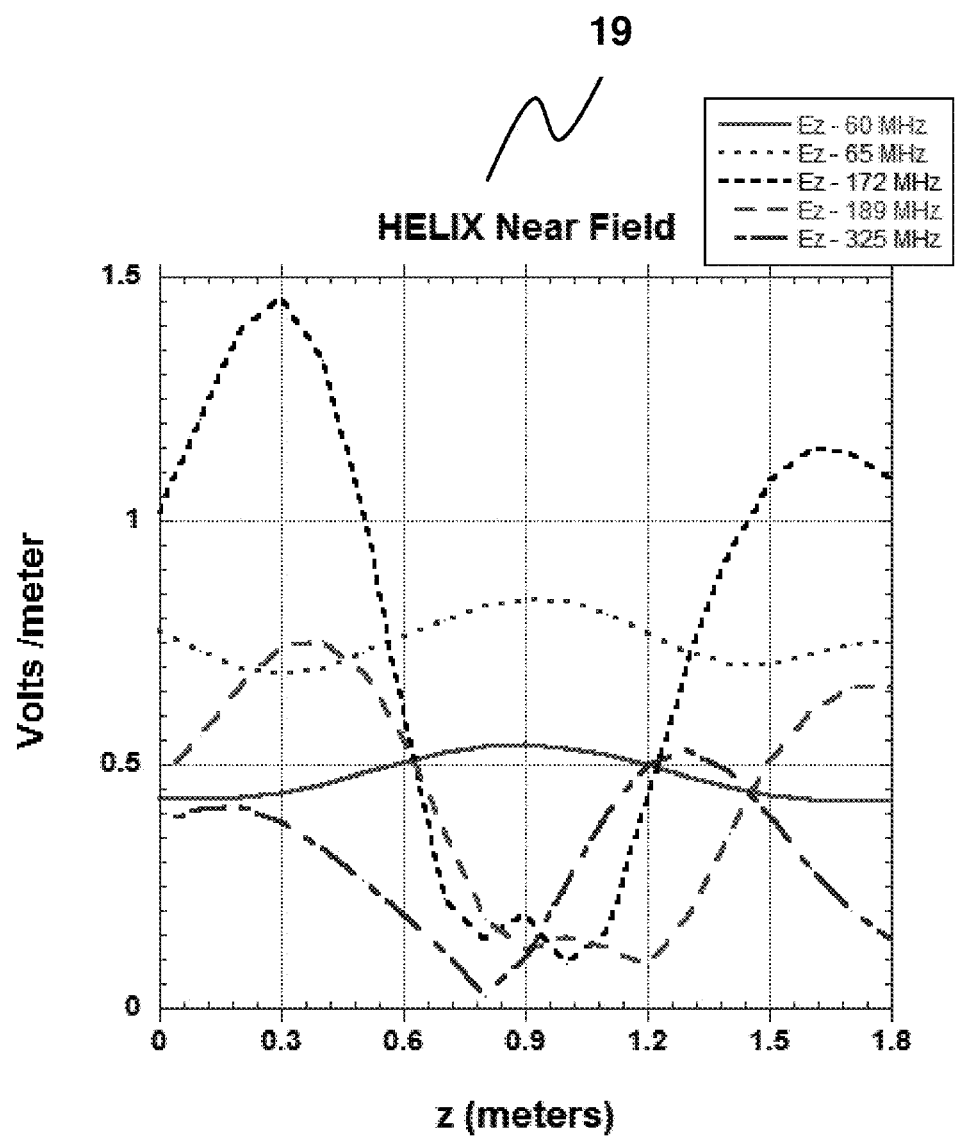
FIG. 4D is a graphical representation illustrating $E_Z$ near electromagnetic field of the helix antenna for the transmitting and receiving antenna, according to one or more embodiments of the present invention.

FIG. 4D is a graphical representation illustrating $E_z$ 19 near electromagnetic field of the helix antenna for the transmitting antenna 1 and receiving antenna 2, according to one or more embodiments of the present invention. In this embodiment, this additional $E_z$ 19 electric field component enables the helix antenna 15 to sense human body movement in all the three spatial axes, an advantage over the dipole antenna, which senses in only two spatial axes when in the x-y plane (z=0). Illustrated in FIG. 4D are vertical $E_z$ 19 electric fields of the helix antenna versus height z at 60, 65, 172, 189, and 325 MHz located at a distance of y=0.8 meters from the axis of the helix 15. At each frequency, the magnitude of the field varies considerably.

Figure 5A:
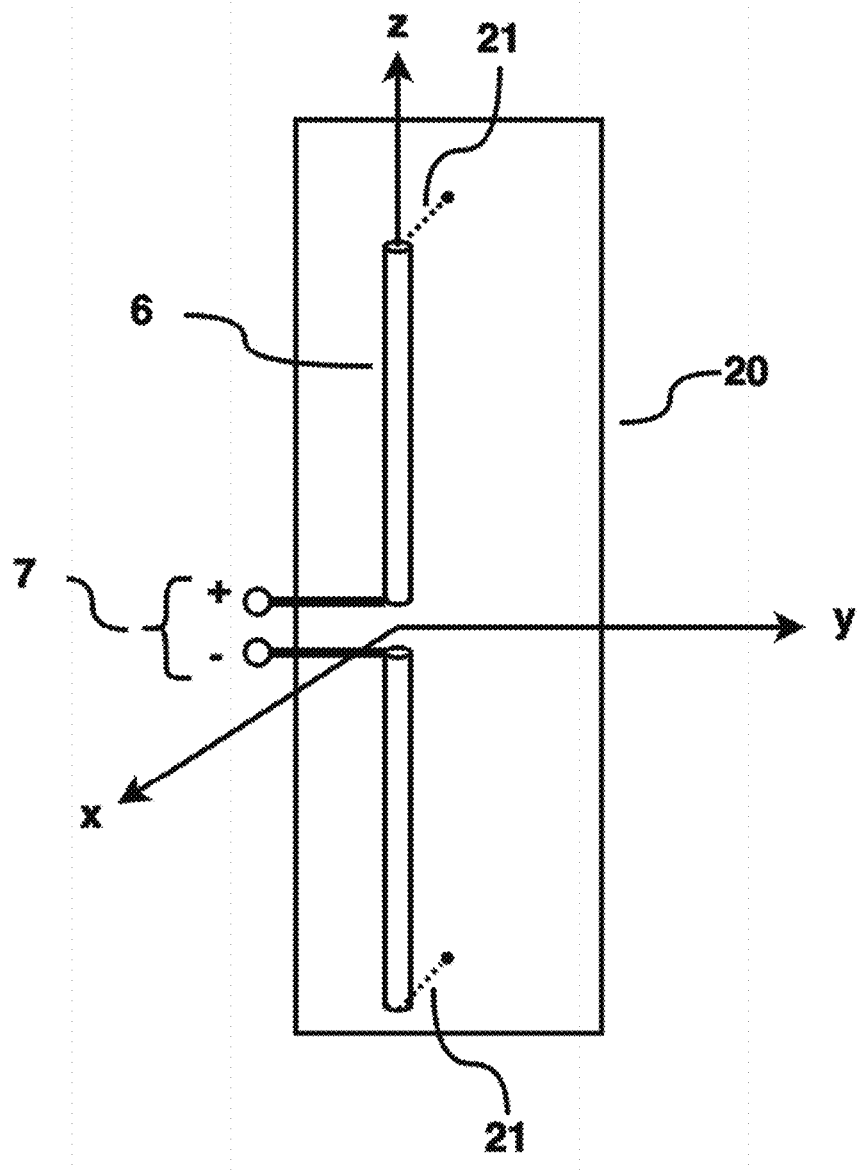
FIG. 5A is a pictorial representation of the dipole antenna with a reflector, according to one or more embodiments of the present invention.

FIG. 5A is a pictorial representation of the dipole antenna 6 with reflector, according to one embodiment of the present invention. In particular, FIG. 5A is an explanatory diagram of a dipole antenna 6 with a reflector structure 20. Particularly, the antenna 6 includes the reflector 20. The reflector 20 is made from a solid or mesh electrical conductor such as copper or aluminum. Moreover, the reflector 20 is positioned behind the dipole antenna 6 or around a portion of the antenna 6. Further, the shape of the reflector 20 is selected from any one of shapes being a square, rectangular, flat, or curved. In operation, the reflector 20 partially surrounds the antenna 6.

Figure 5B:
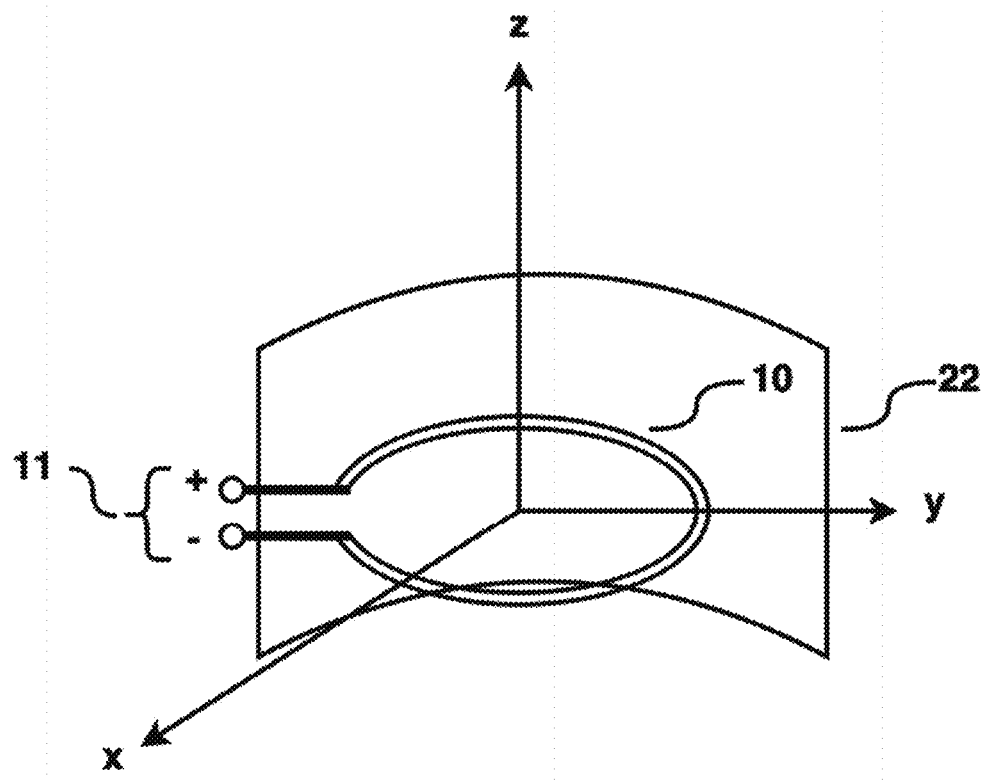
FIG. 5B is a pictorial representation of the loop antenna with a reflector, according to one or more embodiments of the present invention.

FIG. 5B is a pictorial representation of the loop antenna with reflector, according to another embodiment of the present invention. In particular, FIG. 5B is an explanatory diagram of loop antenna 10 with reflector structure 22. Particularly, the reflector 22 is made from a solid or mesh electrical conductor such as copper or aluminum. Moreover, the reflector 22 is positioned behind the antenna 10 or around a portion of the antenna. Further, the shape of the reflector 22 is selected from any one of shapes being a square, rectangular, flat, or curved. In operation, the reflector 22 partially surrounds the loop antenna 10.

Figure 5C:
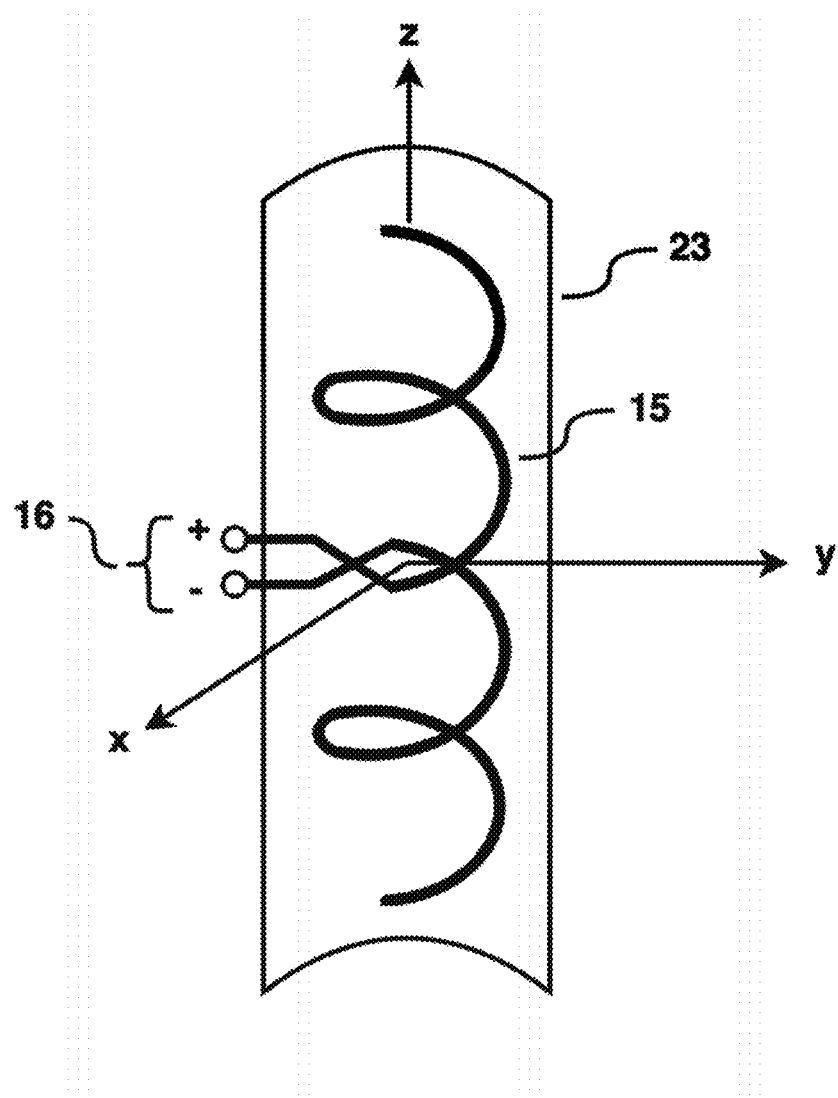
FIG. 5C is a pictorial representation of the helix antenna with a reflector, according to one or more embodiments of the present invention.

FIG. 5C is a pictorial representation of the helix antenna 15 with reflector, according to yet another embodiment of the present invention. In particular, FIG. 5C is an explanatory diagram of helix antenna 15 with reflector structure 23, according to another embodiment of the present invention. The reflector 23 is made from a solid or mesh electrical conductor such as copper or aluminum. Moreover, the reflector 23 is positioned behind the antenna 15 or around a portion of the antenna. Further, the shape of the reflector 23 is selected from any one of shapes being a square, rectangular, flat, or curved. In operation, the reflector 23 partially surrounds the antenna 15.

As illustrated in FIG. 5A, FIG. 5B and FIG. 5C the function of the reflector 20, 22, 23 is to reduce any effects due to interactions with structures such as door frames or walls or any other building structures, as well as to limit exposure to external interfering signals. The reflector 20, 22, 23 also reflects electromagnetic energy from the antenna back towards any person walking, running or moving between the antennas 6, 10 and 15. Particularly, it increases the antenna gain and improves the dynamic range and measurement sensitivity of the human detector system 100. The aperture or beam width of the antenna 6, 10 and 15 can be reduced and antenna gain also changes in the presence of the reflector. The aperture size and antenna gain is controlled by adjusting the spacing 21 between the reflector 20, 22 and 23 and the antenna 6, 10 and 15. Further, the aperture size and antenna gain are controlled by adjusting the size and shape of the reflector. The reflector generally acts to isolate the human detector from external surroundings whilst increasing its sensitivity to the person walking, running or moving between the antennas. The sensitivity of the system is increased by refocusing the electromagnetic energy to the zone of interaction between the transmit antenna 1 and receive antenna 2. The sensitivity of the system 100 is further increased by improving the signal coupling to the feed points of the dipole 7, loop 11, and helix 16 antennas through the use of a balun or impedance matching network.

Figure 6A:
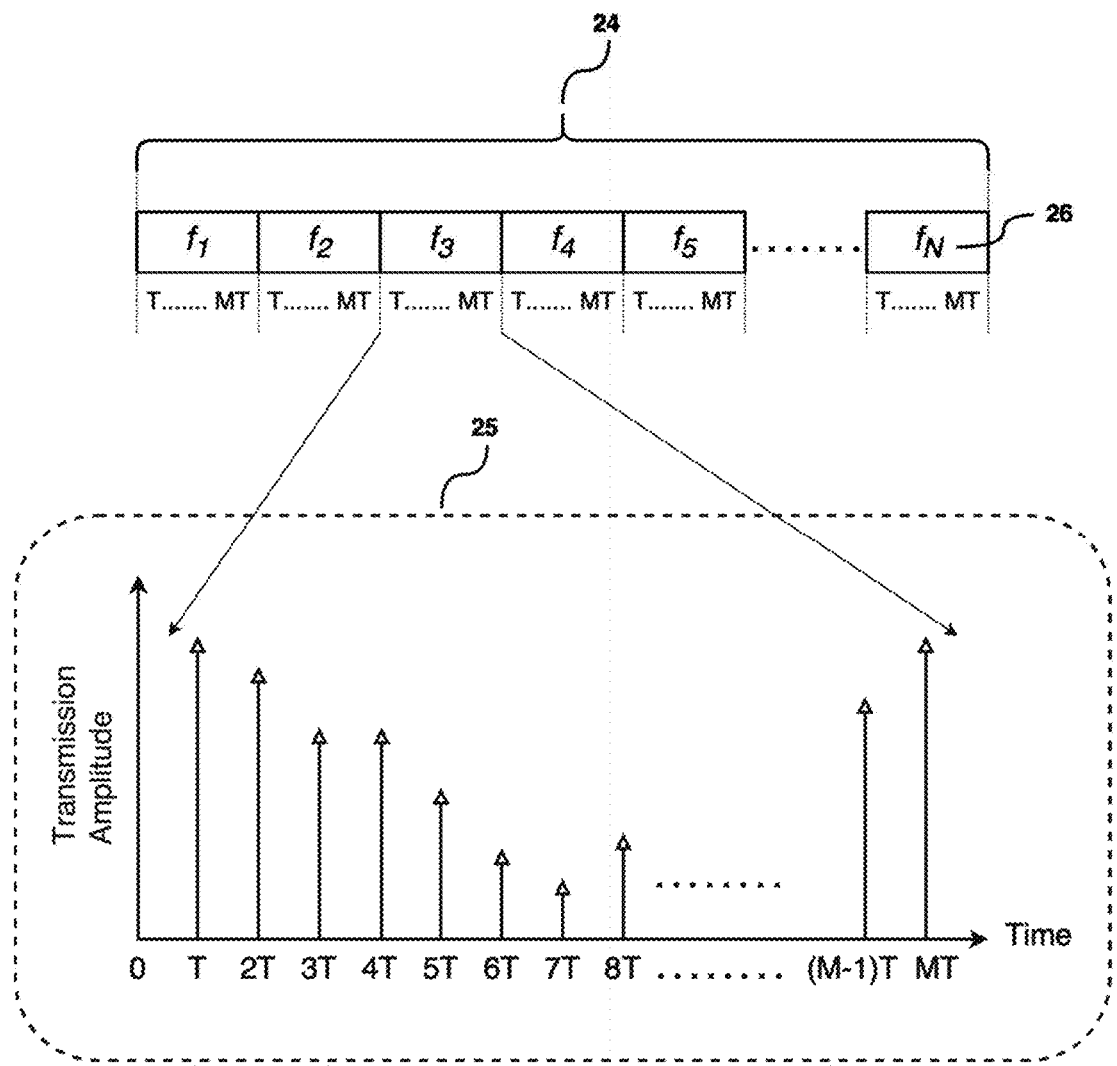
FIG. 6A is a pictorial representation illustrating the organization of the dataframe used in the data processor, according to one or more embodiments of the present invention.

FIG. 6A is a pictorial representation illustrating the organization of the data frame used in the data processor, according to one embodiment of the present invention. As illustrated in FIG. 6A, the data is organized into dataframes 24 wherein each dataframe 24 consists of time domain signatures 25 measured at several different frequencies $f_1$, $f_2$, $f_3$, ... $f_N$ 26 across a broad frequency range generally in the range of 10 to 1000 MHz. Particularly, constructing the dataframe 24 has the following steps. When an unknown person is walking, running or moving between the antennas 1, 2 a significant change in the output of the receiver 4 is detected by the processor 5 of the present system 100. In operation, the processor 5 determines a suitable time-window to record from the continuously buffered transmission data so that the entire time-frequency signature of the unknown person walking, running or moving between the antennas is captured as a dataframe 24. Furthermore, each dataframe consists of time domain signatures 25 measured at several different frequencies $f_1$, $f_2$, $f_3$, ... $f_N$ 26. Henceforth data at these N discrete frequencies is measured one frequency at a time, with each frequency repeated M times with a time period T between successive data points, so that each frequency is recorded over a total time duration of (M×T) 25.

The frequencies in Table 1, are measured frequencies in the following sequence: $f_1$, $f_2$, $f_3$, ..., $f_{11}$, $f_{12}$, $f_1$, $f_2$, $f_3$, ..., $f_{11}$, $f_{12}$, $f_1$, $f_2$, $f_3$, ... with time period T between $f_i$ and the next occurrence $f_{(i+1)}$. The data points are then rearranged into the dataframe format 24, 25. Typical values are T=13.2 msec, N=12 frequencies, and M=160 data points, and hence total measurement time window is equal to (M×T)=160×13.2 msec or 2.112 sec, plus any other small cycle-time delays due to measurement latency etc. In particular, the human detector system 100 is adapted to use other values for N, M and T as warranted by the situation. The dataframes 24 are then normalized and time-aligned from different people and even different human detector systems to allow meaningful comparison of data in order to perform human identification.

In the evaluation phase the results of the typical measurement frequencies illustrate that at the lower end of frequency range, the size of the human body is shorter than the wavelength which results in scattering. The scattering is mostly due to the entire body or a bulk effect which is caused due to the resonance of the torso or entire human body. Particularly, at frequencies on the higher end of the frequency range, the sizes of arms and legs become nearly resonant and thereby result mostly in a dynamic effect due to this motion. Furthermore, the dynamic motion and bulk response of the entire human body movement is captured by interrogating the body with electromagnetic waves over the broad frequency range at different scales and resolution. Due to the close proximity and high coupling of the transmit antennas 1 and receive antennas 2, the frequencies selected do not have to be the actual resonant frequencies of the antennas. Table 1 illustrates typical frequencies of wavelengths used over a broad frequency range with respect to the frequency range and body size of humans detected by the present system 100.

TABLE 1

Typical Measurement Frequencies of wavelengths

| Frequency | MHz | Frequency | MHz |
|---|---|---|---|
| $f_1$ | 80 | $f_7$ | 440 |
| $f_2$ | 190 | $f_8$ | 600 |
| $f_3$ | 280 | $f_9$ | 680 |
| $f_4$ | 340 | $f_{10}$ | 780 |

TABLE 1-continued

Typical Measurement Frequencies of wavelengths

| Frequency | MHz | Frequency | MHz |
|---|---|---|---|
| $f_5$ | 370 | $f_{11}$ | 820 |
| $f_6$ | 410 | $f_{12}$ | 920 |

Figure 6B:
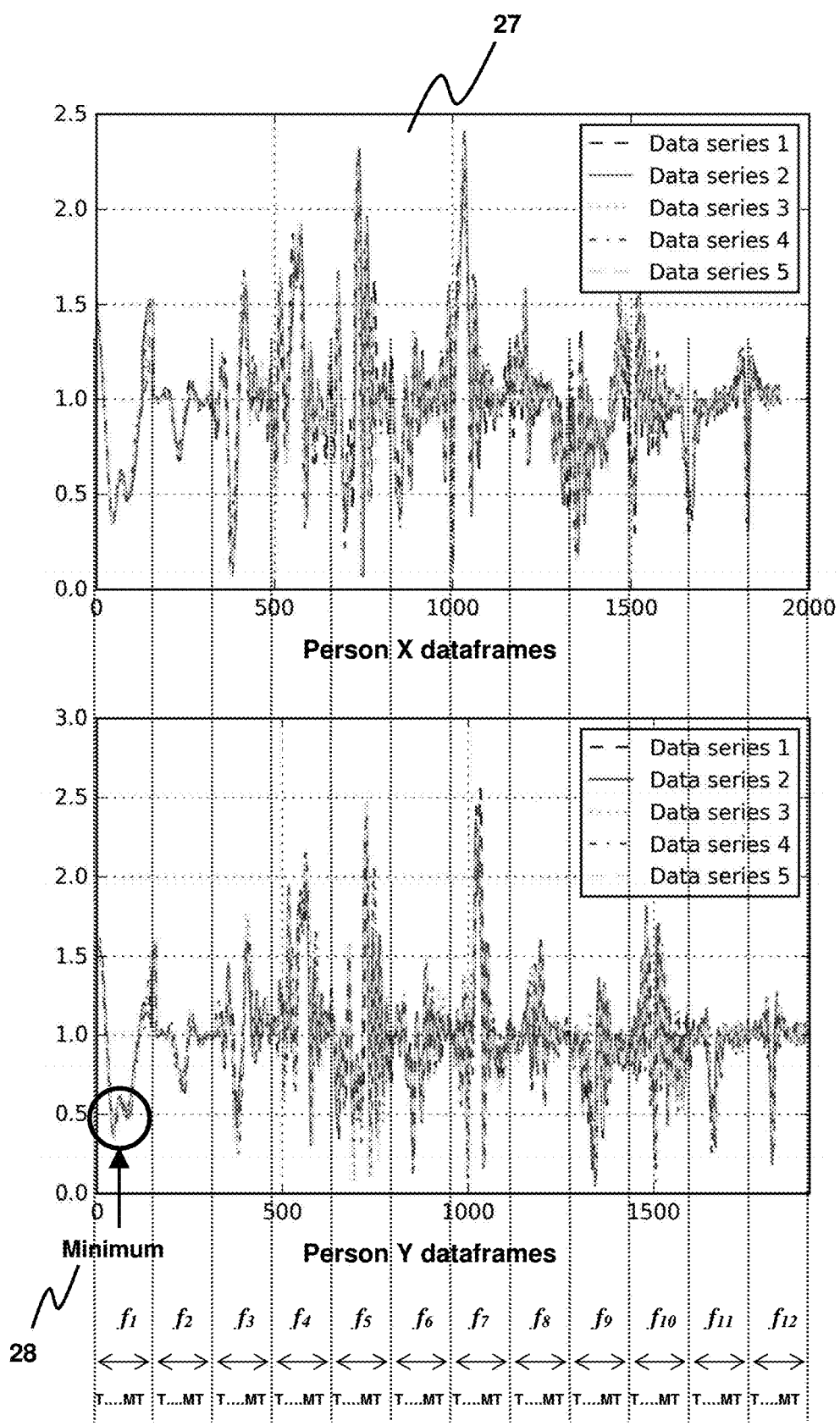
FIG. 6B is a graphical representation depicting the transmission magnitude response plot of typical dataframes of two persons, according to one or more embodiments of the present invention.

FIG. 6B is a graphical representation depicting the transmission magnitude response plot of typical data frames for two different persons. Particularly, the transmission magnitude response plots of five dataframes overlaid or superimposed on top of each other for two persons X and Y is 27. Moreover, each dataframe consists of twelve time-signatures as twelve frequencies are used. The dataframes 24 are also aligned at the minimum value in signature $f_1$ 28. Furthermore, the dataframes 24 are aligned by shifting each one of the time series $f_1$ to $f_N$ by the same time-shift so that all their minima should occur at the same minimum reference point for the $f_1$ signature time series. Henceforth, all dataframes 24 of anyone selected from human beings, subjects, people and persons are aligned in the database 39.

Figure 6C:
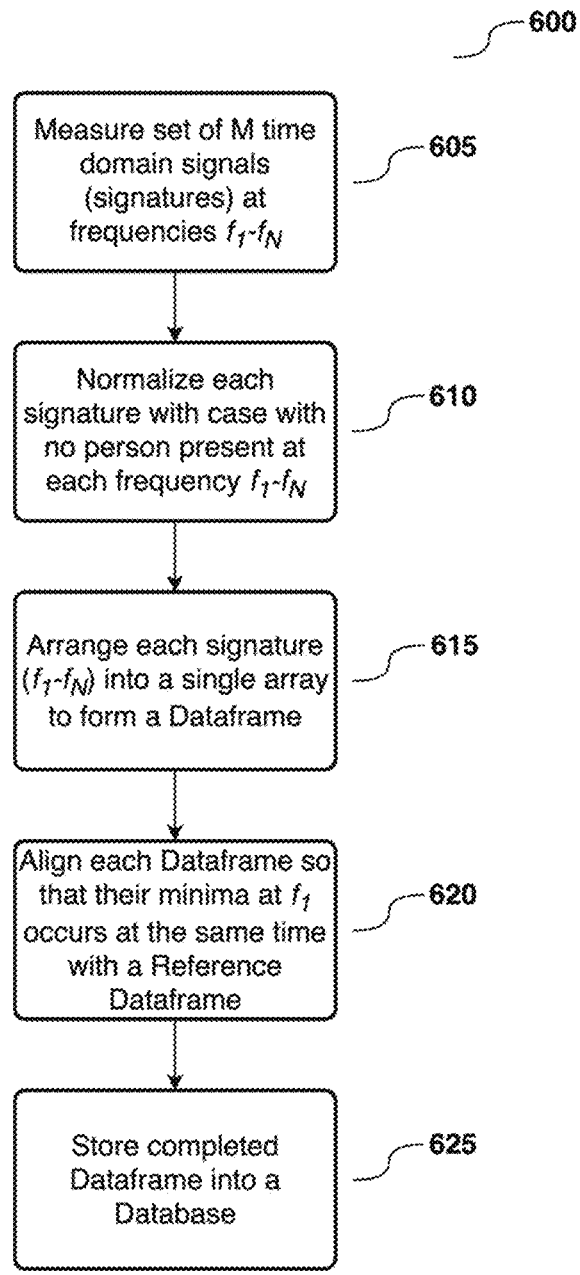
FIG. 6C is a flow diagram illustrating a construction method of the dataframe, according to one or more embodiments of the present invention.

FIG. 6C illustrates a flow diagram for constructing procedure of the dataframe 24, according to one embodiment of the present invention. The process 600 starts at step 605 and proceeds to 610. Particularly, at step 605 the signature of the body movement is measured as time series at multiple frequencies $f_1$ to $f_N$. The process 600 proceeds to step 610 from step 605. At step 610, any magnitude, phase and magnitude-phase signatures of the body movements are normalized. Particularly, the normalization is done by dividing each value of the signature time series by the ambient or quiescent value when no person is present. The step 610 of process 600 proceeds to step 615. At step 615, each signature ($f_1$-$f_N$) is arranged into a single array to form the dataframe 24. The step 615 of process 600 proceeds to step 620. At step 620, signatures are aligned to start and stop at the same time with respect to a reference dataframe 24. Particularly, the signature corresponding to the lowest frequency $f_1$ has generally the slowest variation. The minimum value in the $f_1$ signature is then used as the reference to align all of the dataframes 24. The step 620 of process 600 proceeds to step 625. At step 625, the normalized and time-aligned dataframe 24 is recorded into the database 39.

Figure 7:
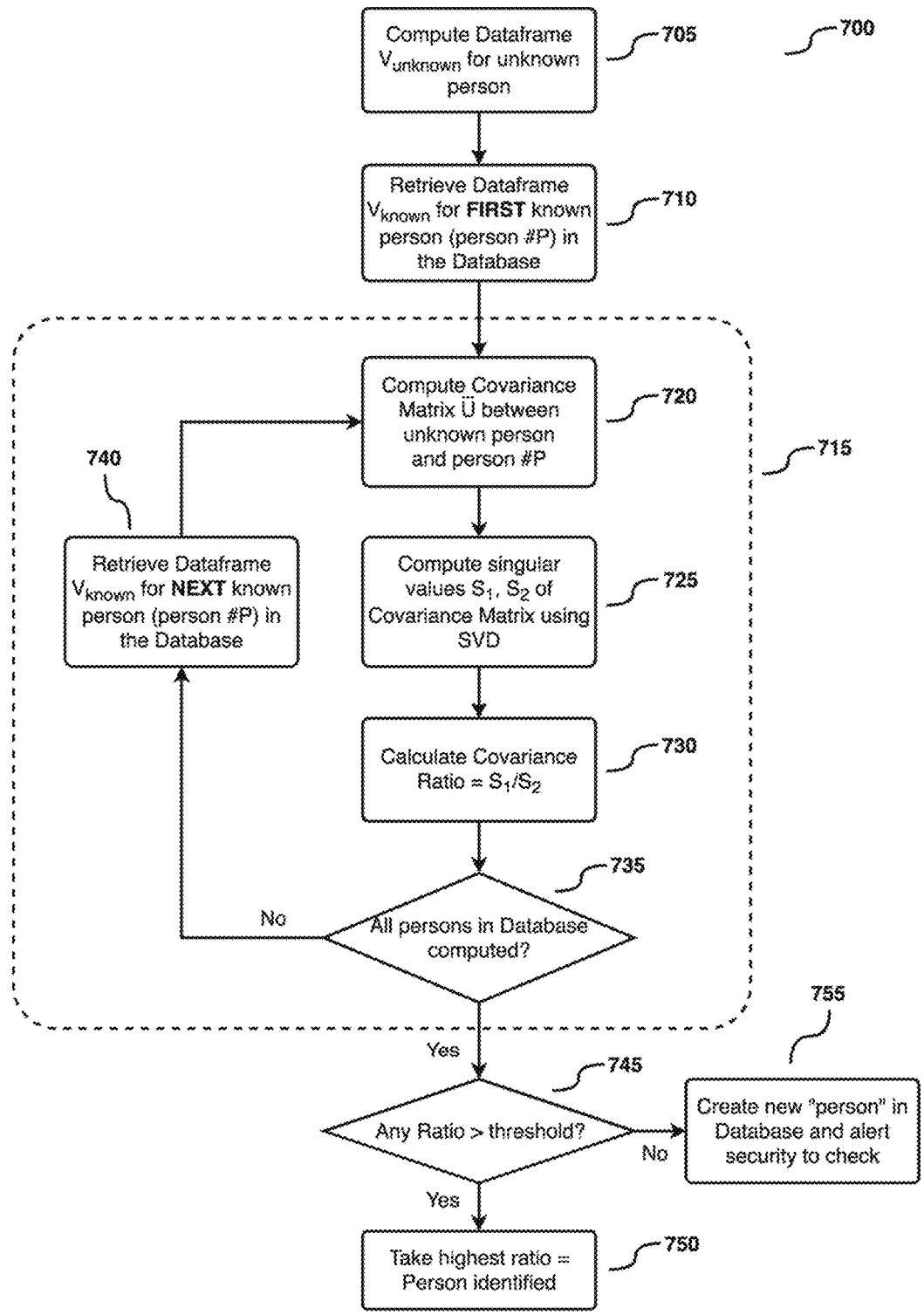
FIG. 7 is a flow diagram illustrating a procedure for computing the covariance matrix used for human identification, according to one or more embodiments of the present invention.

FIG. 7 is a flow diagram illustrating a method for computing the covariance matrix used for human identification according to one embodiment of the present invention. Particularly, to enable time-shifting without incurring loss of data, the processor 5 records a larger superset of time series data before and after the designated (M×T) duration 25. Henceforth, algorithms are applied to compare or correlate these measured sets of signatures or data frames with a library of known signatures and thereby identify the unknown persons walking, running or moving between the antennas 1, 2. Furthermore, identification algorithms include calculating covariance with singular value decomposition (SVD), and machine learning techniques, which include logistic regression and neural networks. This embodiment of the present invention identification algorithms is the Covariance Method with Singular Value Decomposition (SVD), which is used to compare the received signal pattern or dataframe 24 of the unknown person with other dataframes 24 of known persons in a database.

In this embodiment, human identification is achieved by comparing the covariance matrix of the unknown persons with those of known persons in the database 39 using SVD. The process 700 starts at step 705. In operation, every time a new unknown person passes near or between the antennas 1 and 2, their dataframe 24 is measured and calculated as $V_{unknown}$ at step 705. Particularly, the dataframe information is in the form of a row vector of length N frequencies×M field points. Further, the matrix is formed where the first row, $V_{unknown}$ is the dataframe of the unknown person. The process 700 proceeds to step 710. At step 710, the second row is the dataframe of any one of the known persons $V_{known}$ which is retrieved from the database 39. The process 700 proceeds to step 715. At step 715, Singular Values are computed by first calculating the covariance between known and unknown persons. The process 700 proceeds to step 720. At step 720, the resulting covariance between the unknown person and each known person is a 2×2 matrix.

$$\overline{W} = \begin{bmatrix} V_{unknown} \\ V_{known} \end{bmatrix} \text{ and } \overline{U} = \overline{W} \cdot \overline{W}^* = \begin{bmatrix} V_{unknown} \\ V_{known} \end{bmatrix} \cdot \begin{bmatrix} V_{unknown} \\ V_{known} \end{bmatrix}^*$$

The process 700 proceeds to step 725. At step 725, the SVD algorithm is used to compute the singular values $S_1$ and $S_2$.

The process 700 proceeds to step 730. At step 730, the ratio of the singular values $S_1/S_2$, called the covariance ratio, is calculated. The process 700 proceeds to step 735. At step 735, determination is made whether all people's signatures in the database 39 have already been computed.

At step 735, if the determination is "NO" and all people in database 39 are not computed, the method 700 proceeds to steps 740 to retrieve dataframe for $V_{KNOWN}$ for next known person (person # P) in the database 39.

At step 735, if the determination is "YES" and all people in database 39 are computed, the method 700 proceeds to steps 745. At step 745, comparison of covariance ratio and a threshold value is made to determine if any covariance ratio is above the threshold value.

At step 745, if the determination is "NO", the method 700 proceeds to steps 755. At step 755, where none of the ratios are above the threshold, a new "person" is created and added to the database 39 and security personnel is alerted to check the premises. Particularly, the present invention verifies if the new signature actually belongs to a new person or is caused by some other anomaly.

At step 745, if the determination is "YES", the method 700 proceeds to steps 750. At step 750, the highest ratio is used to identify the unknown person.

The covariance method for human identification is best illustrated with an example for identifying four different people. The people are identified as persons A, B, C and D. Particularly, the covariance matrices are computed using measured data from the human detector system for (i) five trials for each person's co-covariance with him/her-self, the results are illustrated in Tables 2A-2D, and (ii) two test runs for each person A-D cross-covariance with each other as shown in Tables 3 and 4.

Table 2A below illustrates results of co-covariance for person A in accordance with this embodiment of the present invention

TABLE 2A

Results of co-covariance for Person A

| Trial #1 | — | 524 | 176 | 159 | 477 |
|---|---|---|---|---|---|
| Trial #2 | 524 | — | 270 | 197 | 494 |

TABLE 2A-continued

Results of co-covariance for Person A

| | | | | | |
|---|---|---|---|---|---|
| Trial #3 | 176 | 270 | — | 146 | 180 |
| Trial #4 | 159 | 197 | 146 | — | 136 |
| Trial #5 | 477 | 494 | 180 | 136 | — |
| | Trial #1 | Trial #2 | Trial #3 | Trial #4 | Trial #5 |

Table 2B below illustrates results of co-covariance for person B in accordance with this embodiment of the present invention.

TABLE 2B

Results of co-covariance for Person B

| | | | | | |
|---|---|---|---|---|---|
| Trial #1 | — | 165 | 203 | 206 | 354 |
| Trial #2 | 165 | — | 164 | 313 | 172 |
| Trial #3 | 203 | 164 | — | 189 | 151 |
| Trial #4 | 206 | 313 | 189 | — | 284 |
| Trial #5 | 354 | 172 | 151 | 284 | — |
| | Trial #1 | Trial #2 | Trial #3 | Trial #4 | Trial #5 |

Table 2C below illustrates results of co-covariance for person C in accordance with this embodiment of the present invention.

TABLE 2C

Results of co-covariance for Person C

| | | | | | |
|---|---|---|---|---|---|
| Trial #1 | — | 164 | 156 | 116 | 97.6 |
| Trial #2 | 164 | — | 228 | 145 | 118 |
| Trial #3 | 156 | 228 | — | 99.1 | 83.5 |
| Trial #4 | 116 | 145 | 99.1 | — | 164 |
| Trial #5 | 97.6 | 118 | 83.5 | 164 | — |
| | Trial #1 | Trial #2 | Trial #3 | Trial #4 | Trial #5 |

Table 2D below illustrates results of co-covariance for person D in accordance with this embodiment of the present invention.

TABLE 2D

Results of co-covariance for Person D

| | | | | | |
|---|---|---|---|---|---|
| Trial #1 | — | 270 | 129 | 109 | 92.9 |
| Trial #2 | 270 | — | 134 | 117 | 104 |
| Trial #3 | 129 | 134 | — | 132 | 210 |
| Trial #4 | 109 | 117 | 132 | — | 245 |
| Trial #5 | 92.9 | 104 | 210 | 245 | — |
| | Trial #1 | Trial #2 | Trial #3 | Trial #4 | Trial #5 |

As illustrated in Table 2A, Table 2B, Table 2C and Table 2D, the test results for persons A, B, C and D are provided in the above tables. For example, for person A the minimum co-covariance is 136 as illustrated in Table 2A, for person B the minimum co-covariance is 151 as illustrated in Table 2B, for person C the minimum co-covariance is 83.5 as illustrated in Table 2C, and for person D the minimum co-covariance is 92.9 as illustrated in Table 2D. The cross-covariance between each person with another person is computed for two test runs #1 and #2 as illustrated in Tables 3 and 4. Henceforth, the maximum covariance is 65.3 which is between person A and B for both test runs. The minimum correlation between person C and D is only 16, which suggests that the correlation between different people is quite low. These values are less than the minimum co-covariance value of 83.5 as illustrated in Tables 2A-2D which shows that the covariance between at least four different people is significantly lower than the covariance for different trials of the same person. Henceforth, the threshold value 745 can be set anywhere between 66 and 83 to distinguish between persons A, B, C and D.

Furthermore, using a correlation threshold value of about 75 provides sufficient margin since it is lower than any of the co-correlation values in Tables 2A-2D and greater than any of the cross-correlation values in Tables 3 and 4.

Table 3 below illustrates results of cross-covariance between person A, person B, person C and person D for Test run #1 in accordance with this embodiment of the present invention.

TABLE 3

Results of Cross-covariance for Test run #1

| | | | | |
|---|---|---|---|---|
| Person A | — | 65.3 | 19.1 | 50.5 |
| Person B | 65.3 | — | 24.9 | 41.9 |
| Person C | 19.1 | 24.9 | — | 16.2 |
| Person D | 50.5 | 41.9 | 16.2 | — |
| | Person A | Person B | Person C | Person D |

Table 4 below illustrates results of cross-covariance between person A, person B, person C and person D for Test run #2 in accordance with this embodiment of the present invention.

TABLE 4

Results of Cross-covariance for Test run #2

| | | | | |
|---|---|---|---|---|
| Person A | — | 65.3 | 19.1 | 52.5 |
| Person B | 65.3 | — | 24.9 | 40.9 |
| Person C | 19.1 | 24.9 | — | 16 |
| Person D | 52.5 | 40.9 | 16 | — |
| | Person A | Person B | Person C | Person D |

Figure 8A:
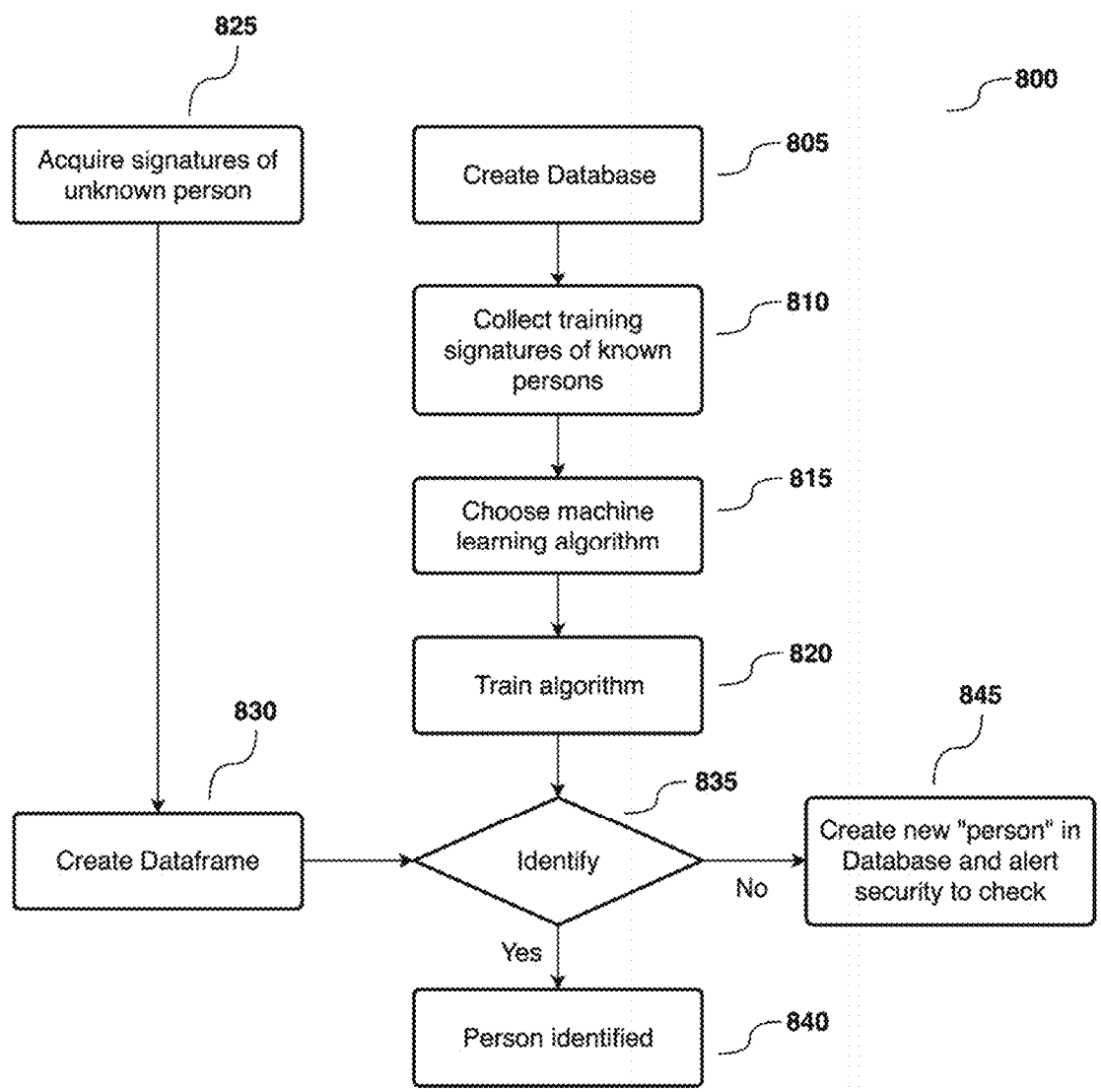
FIG. 8A is a flow diagram illustrating a machine learning method used for human identification, according to one or more embodiments of the present invention.

FIG. 8A is a flow diagram illustrating machine learning method 800 used for human identification, in accordance with one or more embodiments of present invention. Particularly, the present invention provides a method for identifying unknown persons by utilizing a machine learning classification algorithm. The process 800 starts at step 805. At step 805, machine learning method creates a database 39.

Next, step 805 of method 800 proceeds to step 810. At step 810, the training dataframes and sets of signatures are collected for each known person in the database 39. Then step 810 of method 800 proceeds to step 815. At step 815 a suitable machine learning algorithm is selected. Then step 815 of method 800 proceeds to step 820. At step 820, in accordance with this embodiment of present invention training signatures are used to train the selected algorithm. In general, at least four signatures for each person are required for training. Further, the machine learning algorithm 815 is any one of the Logistic Regression, Support Vector Classification, Neural Networks, Random Forest, Nearest Neighbors, Naive Bayes and alike. In the Logistic Regression algorithm, a variation of linear regression is used for the classification of different objects or targets. The training process generally requires each known person to measure or record the movement by walking, running or moving through the human detector system 100 at several sets of frequencies or dataframes 39. Particularly, the training process is used to train the chosen classification algorithm and record these in the database. Then step 820 of method 800 proceeds to step 825.

At step 825, new signatures for unknown person are acquired after training is complete. Then step 825 of process 800 proceeds to step 830 for creating corresponding dataframes. At step 830, the dataframes are created for one or more new signatures for unknown person. Then step 830 of method 800 proceeds to step 835. At step 835, trained machine learning classification algorithms are applied to identify humans. Particularly, the received dataframes or sets of signatures 24 with known dataframes in the database 39 are compared and classified to identify the humans.

At step 835, if the determination is "YES" and the person is identified, the method 800 proceeds to step 840. At step 840, the algorithm is configured to identify one or more persons within the database 39.

At step 835, if determination is "NO" the method 800 proceeds to step 845. At step 845, new "person" record is created in the database 39. Particularly, appropriate security personnel are alerted to check the premises. Additionally, the appropriate security personnel also determine if the new signature actually belongs to the new person or is caused by some other anomaly.

Figure 8B:
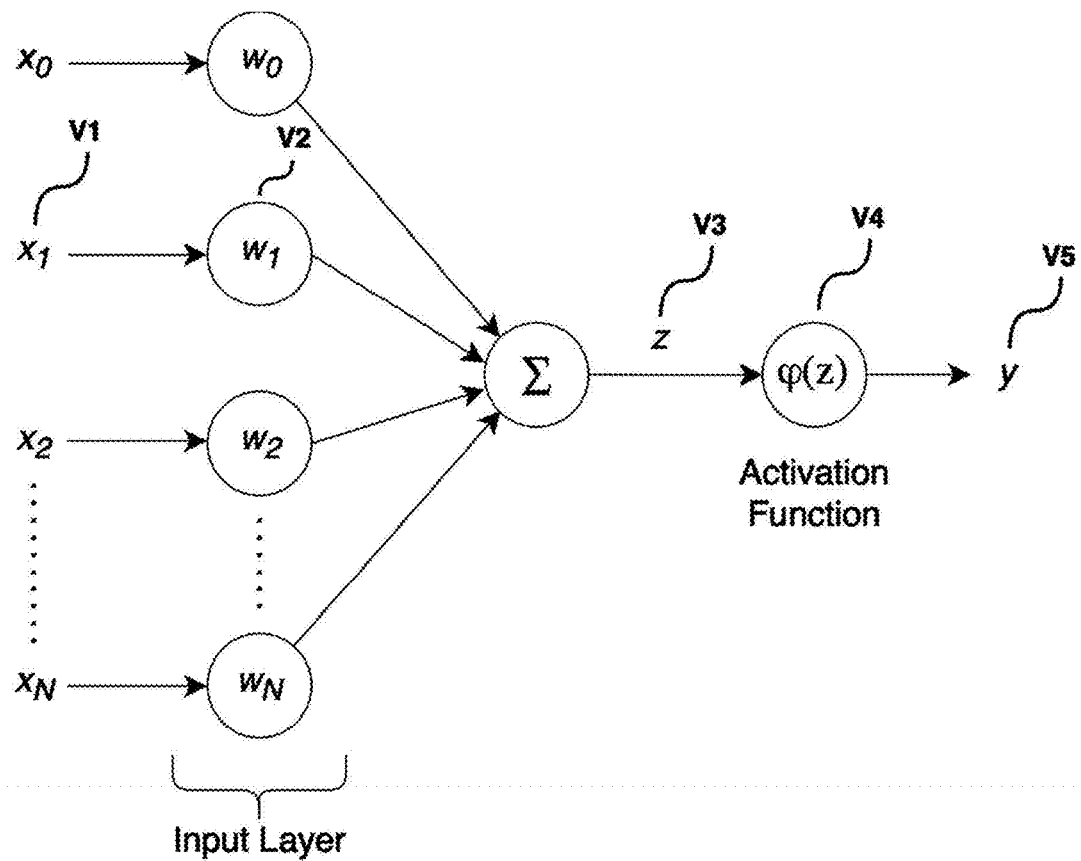
FIG. 8B is a pictorial representation illustrating a logistic regression classification algorithm for the logistic regression model, according to one or more embodiments of the present invention.

FIG. 8B is a pictorial representation of a Logistic Regression Model of the Logistic Regression classification algorithm which is one of the possible machine learning algorithms 815, according to one or more embodiments of the present invention. Tables 5-7 depict results obtained using actual measurement data, according to this embodiment of the present invention.

In FIG. 8B for any linear classifier, then $$z = \sum_{i=0}^{N} w_i x_i,$$

where $x_i$ are the inputs V1, $w_i$ are the weights V2 to be determined and z is the class label V3. Moreover, N+1 is the number of data points used in the present classification. Further, the probability that an event occurs is defined as P and the probability that the event does not occur is defined as (1−P). The odds of an event occurring for the binary case are then defined as P/(1−P)

For Logistic Regression, the following is defined $$\log\left(\frac{P}{1-P}\right) = w_0 x_0 + w_1 x_1 + \ldots + w_n x_n = \sum_{i=0}^{n} w_i x_i$$

where $w_i$ are the weights and $x_i$ are the inputs V1. If the probability, P=0, then $$\log\left(\frac{P}{1-P}\right) = (0) = -\infty$$

and if the probability, P=1, then $$\log\left(\frac{P}{1-P}\right) = \log(\infty) = \infty.$$

If we then define then:

$$z = \log\left(\frac{P}{1-P}\right) \text{ then } e^z = \frac{P}{1-P} \text{ or } P = \frac{e^z}{1+e^z} = \frac{1}{1+e^{-z}},$$

then $$z = \log\left(\frac{P}{1-P}\right) = w_0 x_0 + w_1 x_1 + \ldots + w_n x_n = \sum_{i=0}^{n} w_i x_i$$

The activation function Ø(z) V4 is used to map the output of the classifier to some logic level, y V5.

Particularly, the output of the classifier is the logarithm of the odds and is of the range of −∞ to ∞. Additionally, several activation functions, Ø(z), are possible including any one of the Sigmoid activation function and the hyperbolic tangent TanH activation function.

Figure 8C:
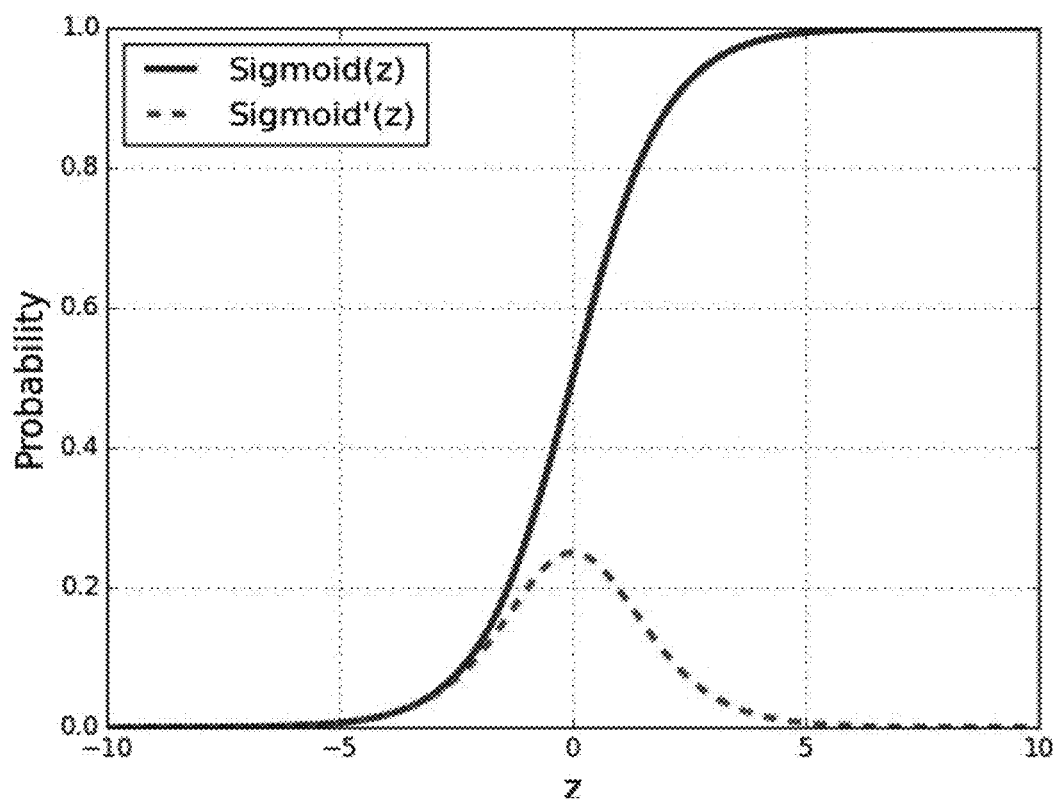
FIG. 8C illustrates a sigmoid activation function, according to one or more embodiments of the present invention.
Figure 8D:
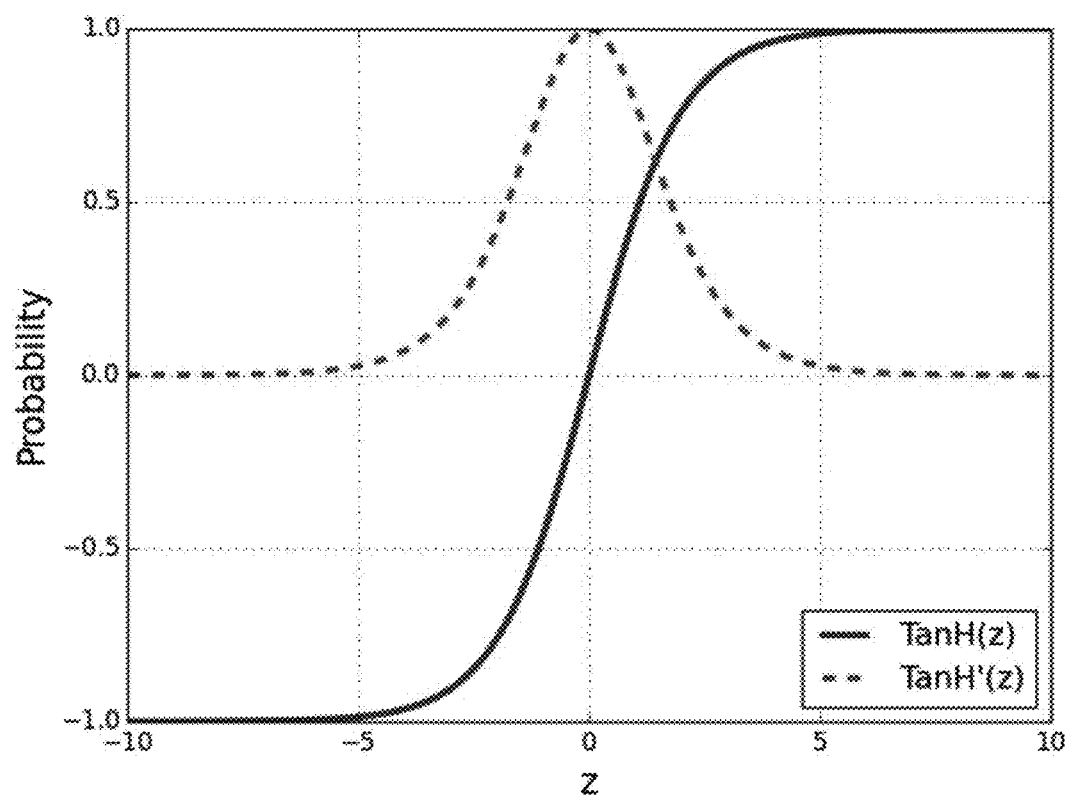
FIG. 8D illustrates a TanH activation function, according to one or more embodiments of the present invention.

FIG. 8C and FIG. 8D are graphical representations depicting a sigmoid activation function and a TanH activation function respectively. Particularly, the sigmoid function maps the z value to a probability value between 0 and 1. The TanH function maps the z value to probability value between −1 and 1. The predicted output is converted to a binary outcome. Particularly, for the Sigmoid function binary case $$y = \begin{cases} 1, & \text{if } \varphi(z) \geq 0.5 \\ 0, & \text{otherwise} \end{cases}.$$

The activation functions are advantageous as their derivatives are known and are easily evaluated in the gradient procedure.

Henceforth, P is interpreted as the probability of a sample belonging to a certain class or individual. For example, P(y=1|x:w) represents the probability that y is equal to the class 1, and also P(y=0|x:w) represents the probability that y is equal to the class 0. A cost function, J(w) is defined for determining the optimum values for the weights, $w_i$ V2, and is defined $$J(w) = \sum_{i=0}^{N} (1 - y_i)\log(1 - P(1 \mid x:w)) + y_i \log(P(1 \mid x:w))$$

$$l(w) = \log(L(w)) = \sum_{i=0}^{N} [y_i \log(\varphi(z_i)) + (1 - y_i)\log(1 - \varphi(z_i))].$$

Maximizing the log-likelihood is equal to minimizing the cost function J(w). Using the logarithm in calculating the likelihood function reduces the potential for numerical underflow:

$$\frac{\partial}{\partial w_j} l(w) = \left\{ y \frac{1}{\varphi(z)} - (1-y)\frac{1}{1-\varphi(z)} \right\} \frac{\partial \varphi(z)}{\partial w_j} \text{ where } \frac{\partial l}{\partial w_j} = \frac{\partial l}{\partial \phi} \frac{\partial \phi}{\partial z} \frac{\partial z}{\partial w_j},$$

$$\text{then where } \frac{\partial z}{\partial w_j} = \frac{\partial}{\partial w_j} \{w_0 x_0 + w_1 x_1 + \ldots + w_n x_n\} =$$

$$x_j \text{ and } \frac{\partial \phi(z)}{\partial z} = \frac{e^{-z}}{(1+e^z)} = \phi(z)(1 - \varphi(z))$$

Finally, the weights V2 is updated and computed using a gradient descent method as follows:

$$w = w + \Delta w \text{ where } \Delta w_j = \frac{\partial}{\partial w_j} J(w) = \sum_{i=0}^{N} (y_i - \varphi(z_i)) x_j^i$$

The Logistic Regression and Support Vector Machines (SVM) classification schemes are binary classifiers. Moreover, the binary classification method is extended for solving multiple classification problems including identifying unknown persons from their signatures.

Examples of Logistic Regression for identifying multiple persons are illustrated in Table 5 and Table 6. As shown in FIG. 6B five dataframes were measured each for two different people, person X and person Y. Particularly, five dataframes are used to train the logistic regression algorithm consisting of 3 signatures from person X and 2 signatures from person Y.

Table 5 illustrates the algorithm which correctly chooses the remaining 5 signatures or dataframes. These are 2 for person X and 3 for person Y.

TABLE 5

Logistic Regression results for five unknown persons

| Unknown Person | X Probability | Y Probability |
|---|---|---|
| Y | 0.04 | 0.96 |
| X | 0.973 | 0.027 |
| Y | 0.058 | 0.942 |
| Y | 0.048 | 0.952 |
| X | 0.979 | 0.021 |

Table 6 illustrates results if a third person Z is introduced—then all six unknown people are correctly identified.

TABLE 6

Logistic Regression results for six unknown persons

| Unknown Person | X Probability | Y Probability | Z Probability |
|---|---|---|---|
| Z | 0.118 | 0.039 | 0.843 |
| Z | 0.062 | 0.03 | 0.908 |
| Y | 0.008 | 0.968 | 0.024 |
| X | 0.878 | 0.014 | 0.108 |
| Y | 0.022 | 0.961 | 0.017 |
| X | 0.945 | 0.012 | 0.044 |

According to this embodiment of present invention, another example for fourteen unknown persons is shown in Table 7. Particularly, all fourteen unknown persons are correctly identified. Moreover, in each case, the correct probability chosen is at least 28% higher than the next highest probability. Furthermore, in each of the aforementioned cases, the Logistic Regression algorithm correctly chooses the correct person from the list. Table 7 illustrates results of Logistic Regression for fourteen unknown persons.

Figure 8E:
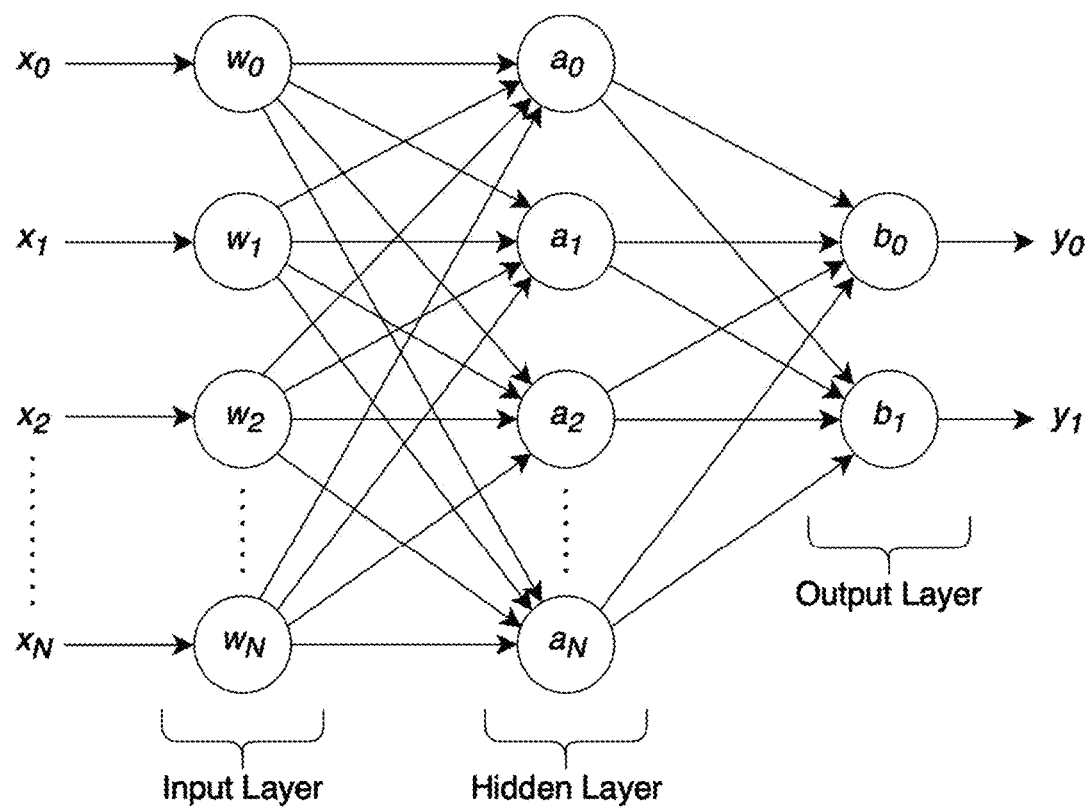
FIG. 8E illustrates a neural network model, according to one or more embodiments of the present invention.

Logistic regression and SVM are known as single layer classifiers. Additional layers can also be included between the input and output layers for identifying large numbers of people. These are known as Artificial Neural Networks (ANN) or simply Neural Networks, as depicted in FIG. 8E, according to one or more embodiments of the present invention. Although, unlike Logistic Regression and SVM, the output layer in neural networks is having multiple neurons or nodes wherein each node corresponds to a different class. The back propagation algorithm is a popular technique for training the ANN.

Figure 8F:
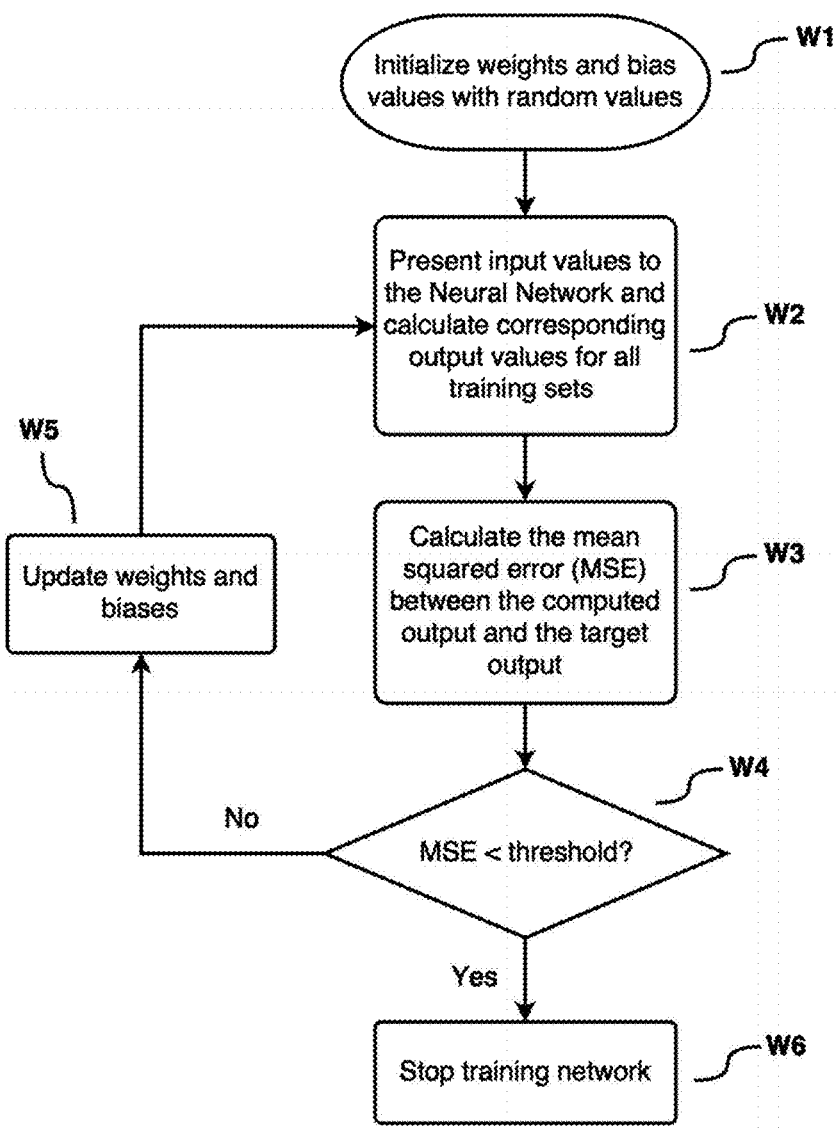
FIG. 8F illustrates a back-propagation algorithm for training the neural network, according to one or more embodiments of the present invention.

FIG. 8F illustrates a back propagation algorithm for training the Neural Network, according to one or more embodiments of the present invention. Particularly, the algorithm is like the logistic regression algorithm; which uses an iterative algorithm to determine the weight, $w_i$ values. Moreover, the back propagation algorithm begins by initializing the weights using random values W1. This results in an error for the output of each node, which is the difference between its output value and target value W2, W3. Furthermore, the next step is to compute the gradient of this error as a function of the node or neuron weights and adjust the weights in the direction that most decreases the error W5 and propagate these output errors backward to infer the errors in the hidden layer W2. Particularly, to compute the gradients of the errors W3 and adjust the hidden layer weights $a_0, a_1, a_2, \ldots a_n$ in the direction that most decreases the error W5. According to this embodiment of present invention, the present method runs many times W4 for the node values for the input, output and hidden layers to converge W6.

Figure 9A:
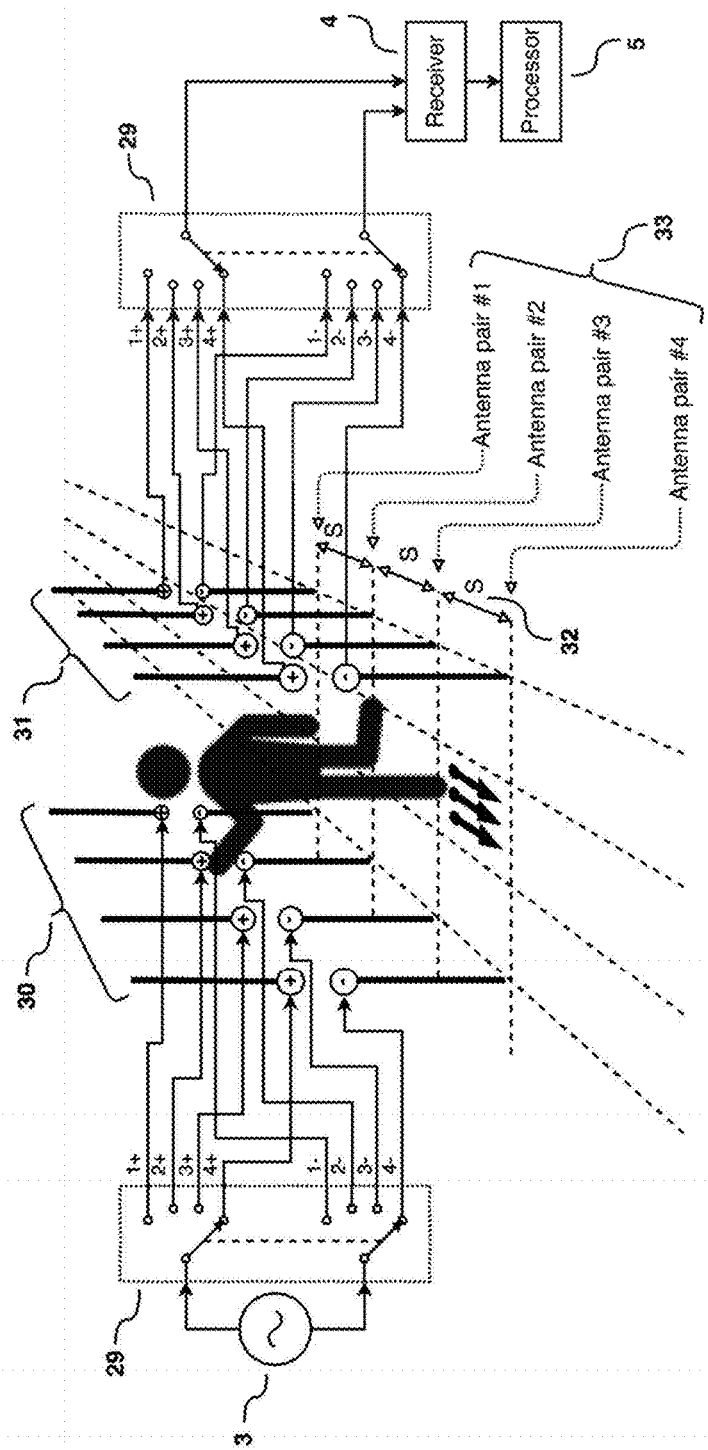
FIG. 9A illustrates the human detector system utilizing an array of switched antenna pairs, according to one or more embodiments of the present invention.

FIG. 9A illustrates the human detector system utilizing an array of switched antenna pairs, according to one or more embodiments of the present invention. Particularly, FIG. 9A shows the enhanced stand-alone human detector system of FIG. 1, through the use of multiple pairs of transmit-receive antennas arranged as an array of switched antenna pairs 30, 31. Furthermore, a four-antenna-pairs configuration is shown in 33. Also in general, a different number of switched antenna pairs may be used.

In this embodiment of the present invention multi-throw radio frequency switches 29 are needed at the transmitter and receiver to select the terminals of the antenna feed points of the transmit-receive antenna pairs 33. Henceforth, antenna pairs 33 are switched-in and connected to the transmitter 3 and receiver 4 one pair at a time as per the following sequence: pair #1, pair #2, pair #3, pair #4, pair #1, pair #2 pair #3, pair #4, pair #1, pair #2, . . . pair # n in a repeated loop. Furthermore, control signal from the processor 5 synchronize the transmitter and receiver switches 29 explicitly with each other and also with the operation of the transmitter 3 and receiver 4. Henceforth, each antenna pair is separated from neighboring pairs 33 by a distance S

TABLE 7

Results of Logistic Regression for fourteen unknown persons

| G Probability | 0.002 | 0.025 | 0.022 | 0.019 | 0.005 | 0.001 | 0.699 | 0.841 | 0.008 | 0.03 | 0.097 | 0.044 | 0.009 | 0.009 |
|---|---|---|---|---|---|---|---|---|---|---|---|---|---|---|
| F Probability | 0.056 | 0.625 | 0.009 | 0.729 | 0.015 | 0.017 | 0.13 | 0.044 | 0.074 | 0.055 | 0.033 | 0.004 | 0.023 | 0.011 |
| E Probability | 0.022 | 0.075 | 0.004 | 0.143 | 0.001 | 0.025 | 0.005 | 0.006 | 0.813 | 0.022 | 0.03 | 0.001 | 0.601 | 0.001 |
| D Probability | 0.891 | 0.084 | 0.003 | 0.096 | 0.03 | 0.935 | 0.004 | 0.003 | 0.052 | 0.004 | 0.002 | 0.003 | 0.044 | 0.002 |
| C Probability | 0.012 | 0.068 | 0.002 | 0.006 | 0.026 | 0.012 | 0.079 | 0.008 | 0.047 | 0.836 | 0.799 | 0.002 | 0.317 | 0.059 |
| B Probability | 0.003 | 0.013 | 0.955 | 0.003 | 0.003 | 0.003 | 0.004 | 0.092 | 0.003 | 0.003 | 0.016 | 0.929 | 0.002 | 0.008 |
| A Probability | 0.013 | 0.109 | 0.005 | 0.006 | 0.921 | 0.006 | 0.08 | 0.008 | 0.003 | 0.049 | 0.023 | 0.017 | 0.003 | 0.909 |
| Unknown Person | D | F | B | F | A | D | G | G | E | C | C | B | E | A |

32 which is typically somewhere between 10 cm to 50 cm. Moreover, the rest of the switched antenna pair array hardware configuration in FIG. 9A is essentially identical to that of the basic single antenna pair configuration in FIG. 1.

Figure 9B:
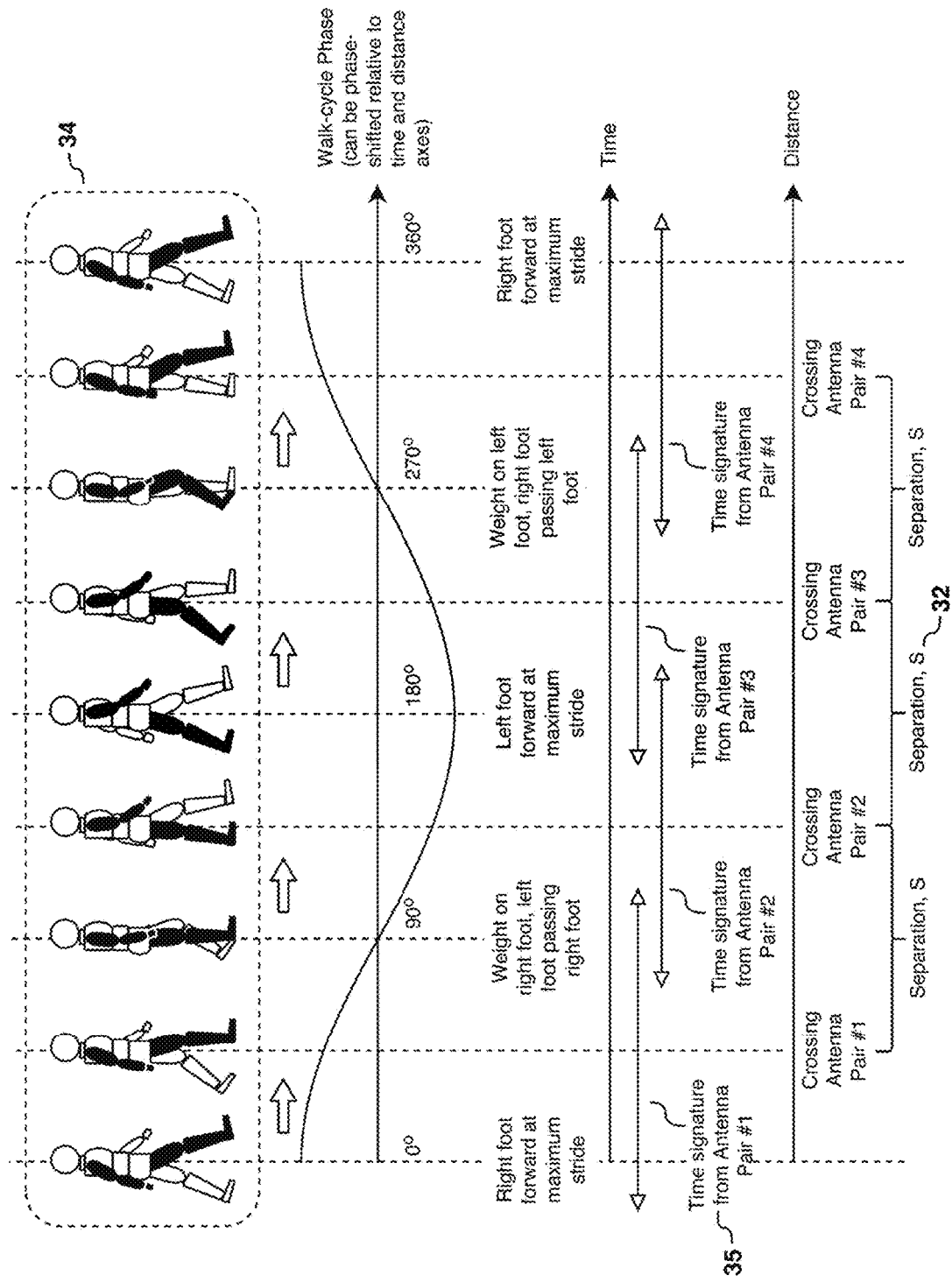
FIG. 9B illustrates phases of a human walk-cycle and its relation to the array of switched antenna pairs, according to one or more embodiments of the present invention.

FIG. 9B illustrates phases of a human walk-cycle and its relation to the array of switched antenna pairs, according to one or more embodiments of the present invention. Particularly, the switched antenna pairs array is best used in conjunction with reflectors for the antennas 20, 22, 23, which narrows the aperture or beam width of the antennas. Moreover, it results in time-signatures which are shorter in duration, so that the time-signature from each antenna pair 35 is able to capture only a section of a person's entire walk-cycle 34 as illustrated in FIG. 9B, which is one motivation for having multiple antenna pairs 33 to cover the entire walk-cycle. Furthermore, a close examination of the person's walk-cycle 34 reveals that the person crosses antenna pairs #1, #2, #3 and #4 at different phases of his or her walk cycle. Henceforth, the time signature of each antenna pair 35 contains unique information that is not repeated in the time signatures of neighboring antenna pairs. Particularly, the use of multiple switched antenna pairs 33 allows the electromagnetic time signature 35 to be captured over all the phases of a human walk-cycle 34, which increases the probability of success in correctly identifying the person walking between the arrays of antenna pairs.

Moreover, the use of two or more antenna pairs 33 also adds extra features to the human detector system for measurement of walking speed and the discrimination between direction of entry or exit through the antenna pairs. Walking speed and the discrimination between direction of entry or exit through the antenna pairs is determined from the separation S 32 between neighboring antenna pairs 33 and the time signatures of neighboring antenna pairs 35, which have a time-offset from each other. In particular according to this embodiment of present invention, four antenna pairs configuration 33 means that four signatures or data frames are generated 35 over a single person's walk-cycle 34, so the data volume generated is four times larger than that of a single antenna pair configuration.

Figure 9C:
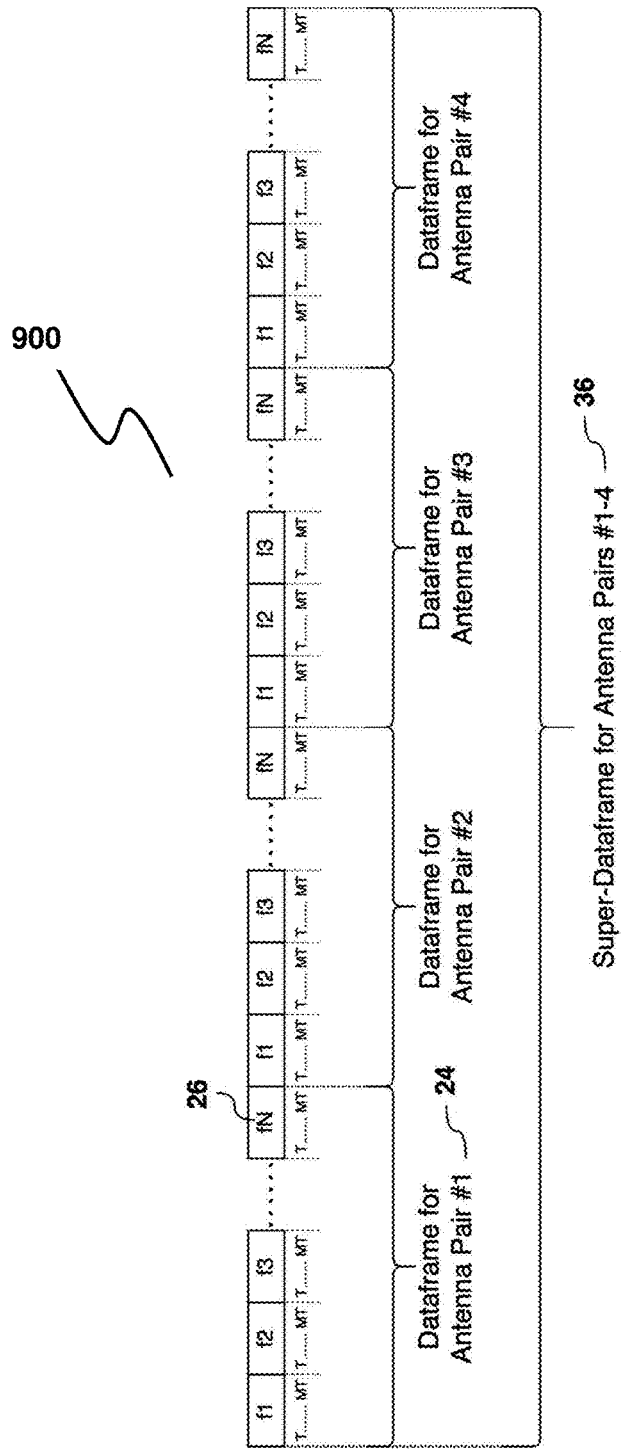
FIG. 9C illustrates the concatenation of data frames to construct a super-dataframe, according to one or more embodiments of the present invention.

FIG. 9C illustrates the concatenation of data frames to construct a super-dataframe, 900 according to this embodiment of the present invention. Particularly, data formatting, the four dataframes 24 from the four antenna pairs are concatenated into one super-dataframe 36 as illustrated in FIG. 9C. Moreover, it can be generalized for a different number of antenna pairs—For $N_p$ antenna-pairs, the super-dataframe is a concatenation of $N_p$ single-dataframes. Particularly, data processing for this super-dataframe follows the same procedures and identification algorithms as for the single-dataframe described in earlier paragraphs and illustrated in the flowcharts in FIGS. 6C, 7 and 8A.

Figure 9D:
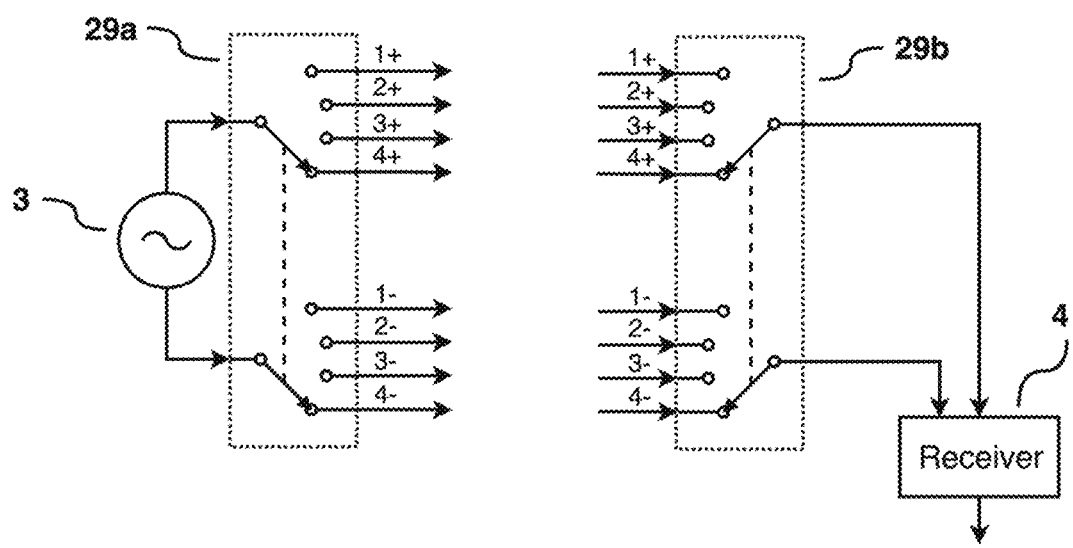
FIG. 9D is a pictorial representation illustrating configuring means having one or more switches as distributing and combining signals according to one or more embodiments of the present invention.
Figure 9E:
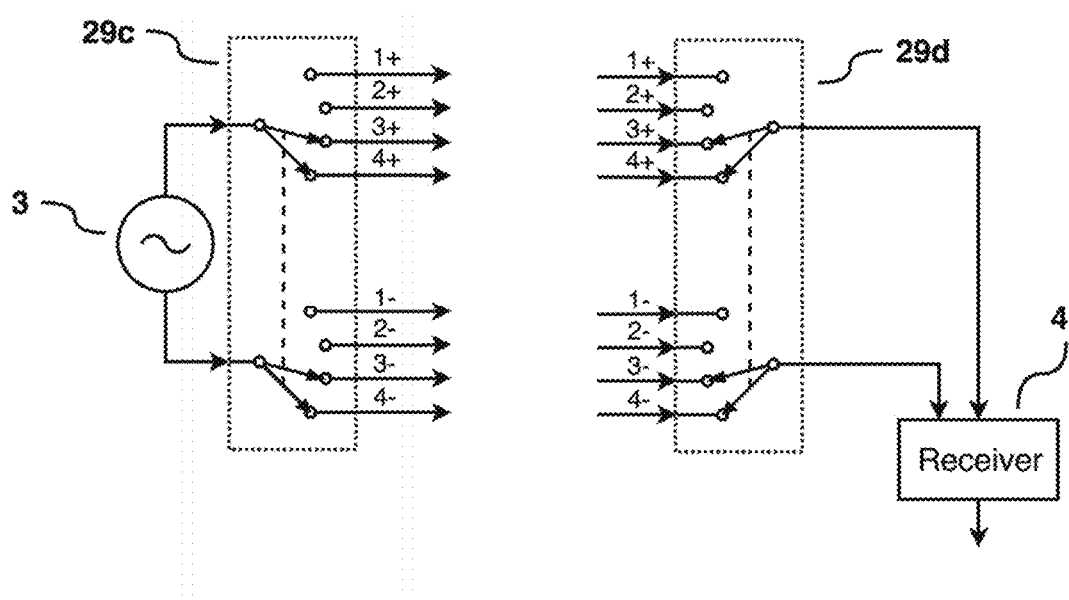
FIG. 9E is a pictorial representation illustrating configuring means having one or more multiplexers and one or more couplers as means for distributing and combining signals, according to one or more embodiments of the present invention.
Figure 9F:
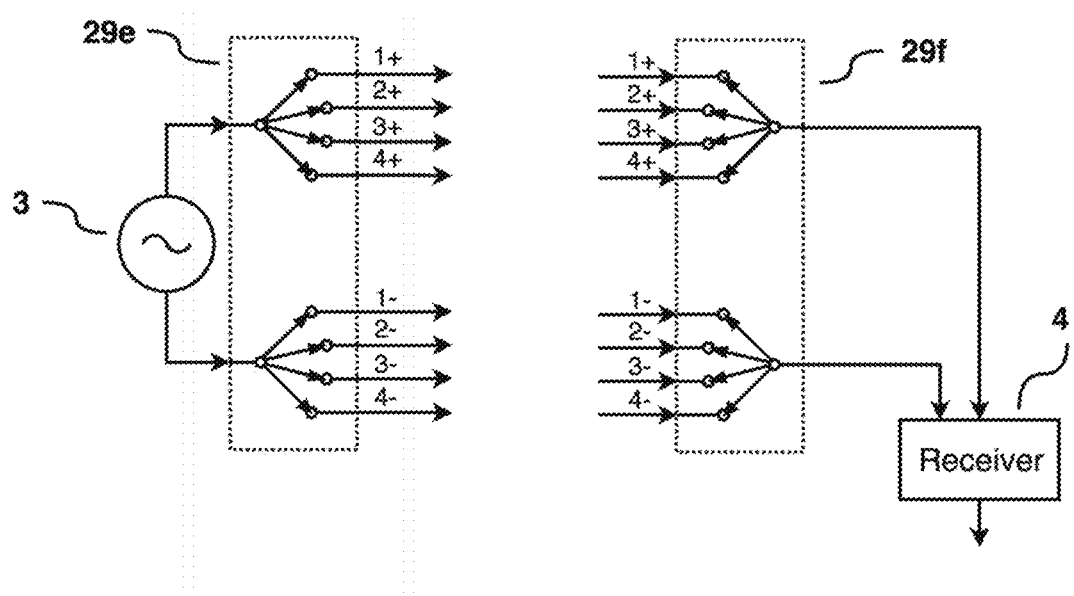
FIG. 9F is a pictorial representation illustrating configuring means having one or more power dividers and one or more combiners as means for distributing and combining signals, according to one or more embodiments of the present invention.
Figure 9G:
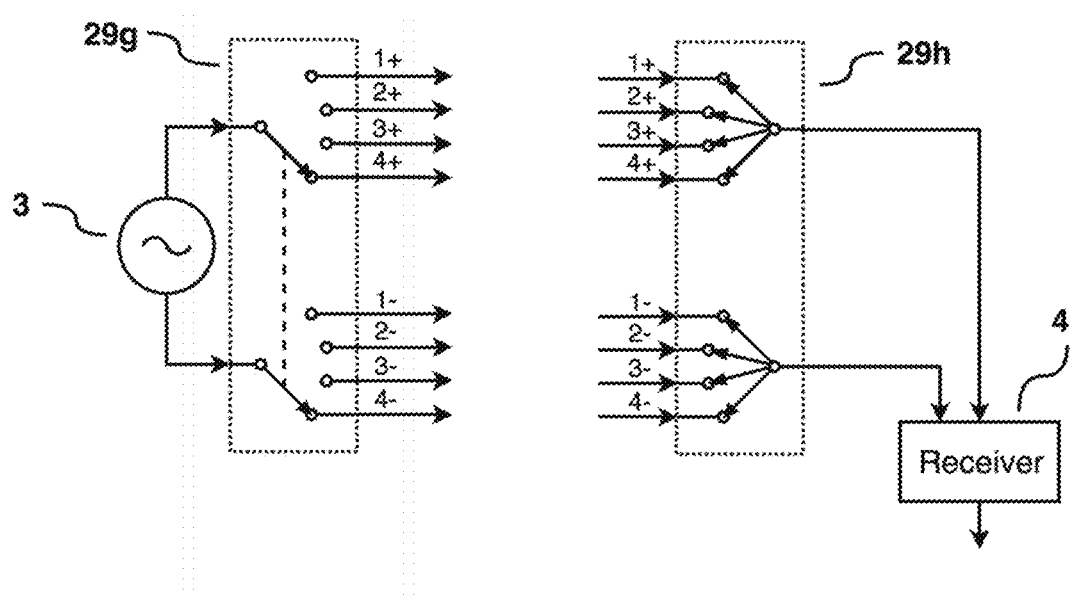
FIG. 9G is a pictorial representation illustrating configuring means having one or more switches as means for distributing signals and one or more power combiners as means for combining signals, according to one or more embodiments of the present invention.
Figure 9H:
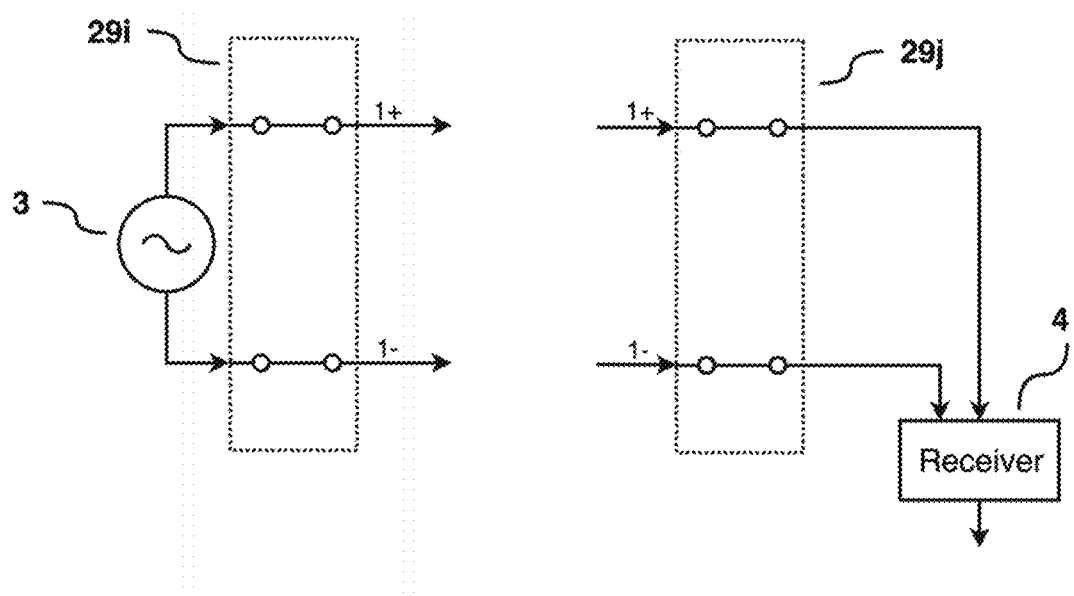
FIG. 9H is a pictorial representation illustrating configuring means having one or more through-lines as means for distributing and combining signals in a human detector system with a single antenna pair, according to one or more embodiments of the present invention.

The multi-throw switches 29 in FIG. 9A are one embodiment of many possible configuring means for connecting the transmitter 3 to the transmit antenna array 30 and for connecting the receiver 4 to the receive antenna array 31. Other possible configuring means are illustrated in FIGS. 9D to 9H, according to other embodiments of the present invention. FIG. 9D is a pictorial representation illustrating configuring means having one or more switches as distributing 29a and combining 29b means according to one embodiment of the present invention such as the one shown in FIG. 9A. FIG. 9E is a pictorial representation illustrating configuring means having one or more multiplexers and one or more couplers as means for distributing 29c and combining 29d signals according to another embodiment of the present invention. FIG. 9F is a pictorial representation illustrating configuring means having one or more power dividers and one or more combiners as means for distributing 29e and combining 29f signals according to yet another embodiment of the present invention. FIG. 9G is a pictorial representation illustrating configuring means having one or more switches as means for distributing signals 29g and one or more power combiners as means for combining signals 29h according to yet another embodiment of the present invention and FIG. 9H is a pictorial representation illustrating configuring means having one or more through-lines as means for distributing 29i and combining 29j signals in a human detector system with a single antenna pair according to yet another embodiment of the present invention such as the stand-alone human detector system illustrated in FIG. 1.

Particularly, configuring means is any one of first configuring means and second configuring means. Moreover, first configuring means and second configuring means is any one of a switching means, a combining means, a splitting means and alike for combining or distributing signals and may be used in different combinations with each other. Additionally, the switch selects any one routing mechanism selected from routing of one or more input signals to a single output terminal 29b and routing of single input signal to anyone of the output terminals 29a and 29g. In FIG. 9G, the switch 29g distributes the transmit signal and power combiner 29h combines the received signals in a human detector system with a first array and second array of antennas. In FIG. 9H, the through line 29i and through line 29j are used for both the transmitter and receiver signals in a human detector system with only a single antenna pair such as the one in FIG. 1. In FIG. 9E, the multiplexer provides a single output signal from input signals 29d and distributes a single input signal to output signals 29c. Henceforth, the coupler performs a similar function to the multiplexer 29c and multiplexer 29d. Power combiner 29f in FIG. 9F and power combiner 29h in FIG. 9G are combining signal devices whilst divider 29e in FIG. 9F is a dividing signal device. In FIG. 9H, the through-line configuring means connects the output from the second antenna to the receiver input 29j and connects the transmitter output to the first antenna 29i.

Figure 10A:
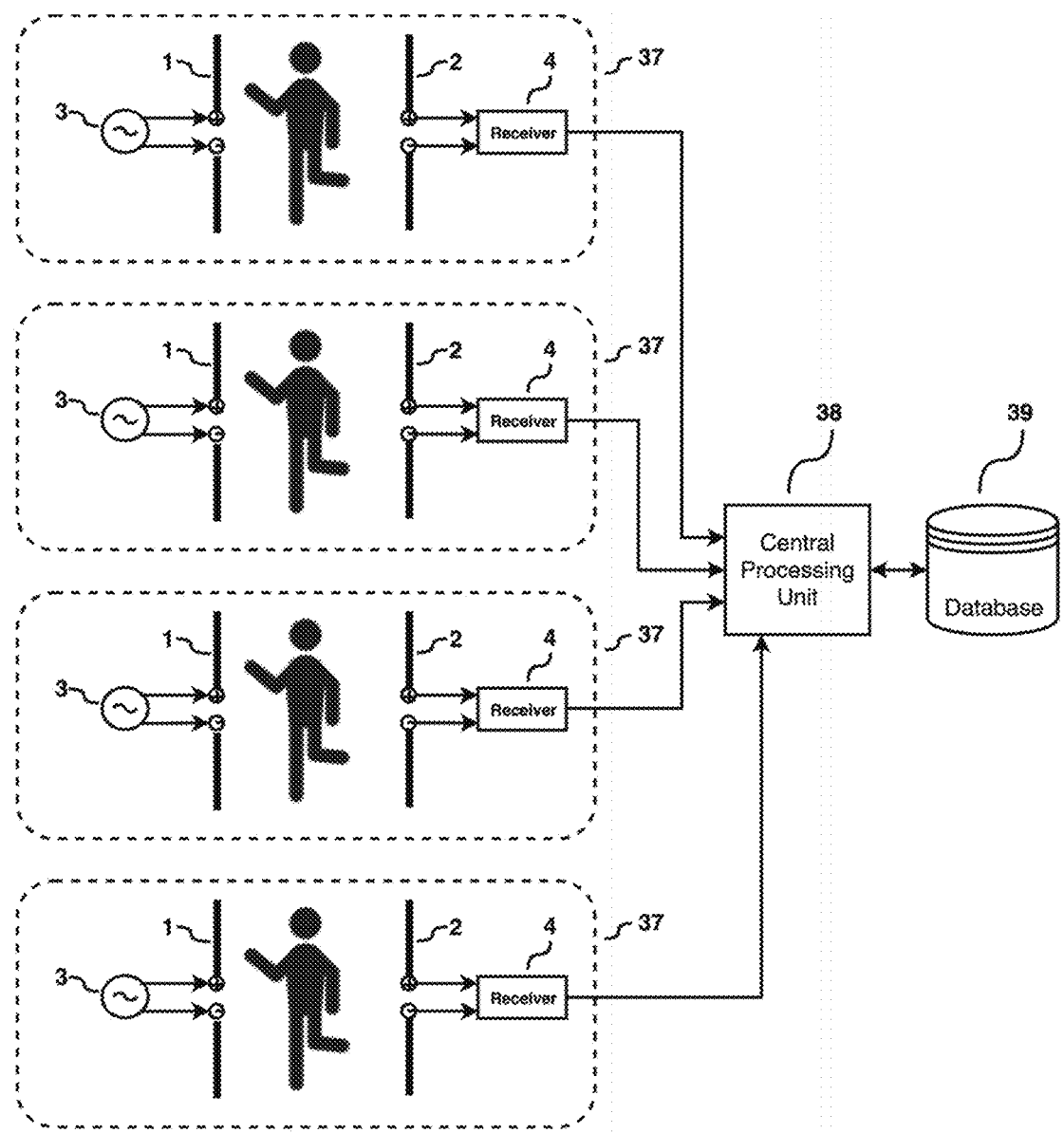
FIG. 10A illustrates one or more electrically wired multiple sensor node configurations for the human detector system, according to one embodiment of the present invention.

FIG. 10A illustrates one or more wired multiple sensor node configurations for the human detector system 100, according to one embodiment of the present invention. The wired configuration multiple sensor nodes in the human detector sub-systems 37 includes a transmitter 3 and transmit antenna 1, receiver 4 and receiver antenna 2. The sensor nodes 37 are distributed in-building or over a campus area. Subsequently, human detector sub-systems 37 are similar to the human detection system 100 as shown in FIG. 1 but human detector sub-systems nodes 37 are without the processor, instead the system includes a central processing unit (CPU) 38 and a database 39 according to this embodiment. Particularly, the central processing unit 38 collects and processes data from all of the receivers 4 and records the data and stores in the database 39. Moreover, the receivers 4 and central processing unit 38 are electrically connected via wires for establishing the communication link. Furthermore, the wire is anyone of a copper cable, a fiber optic link and the like. Henceforth, one or more receivers 4 are controlled by the central processing unit 38.

Figure 10B:
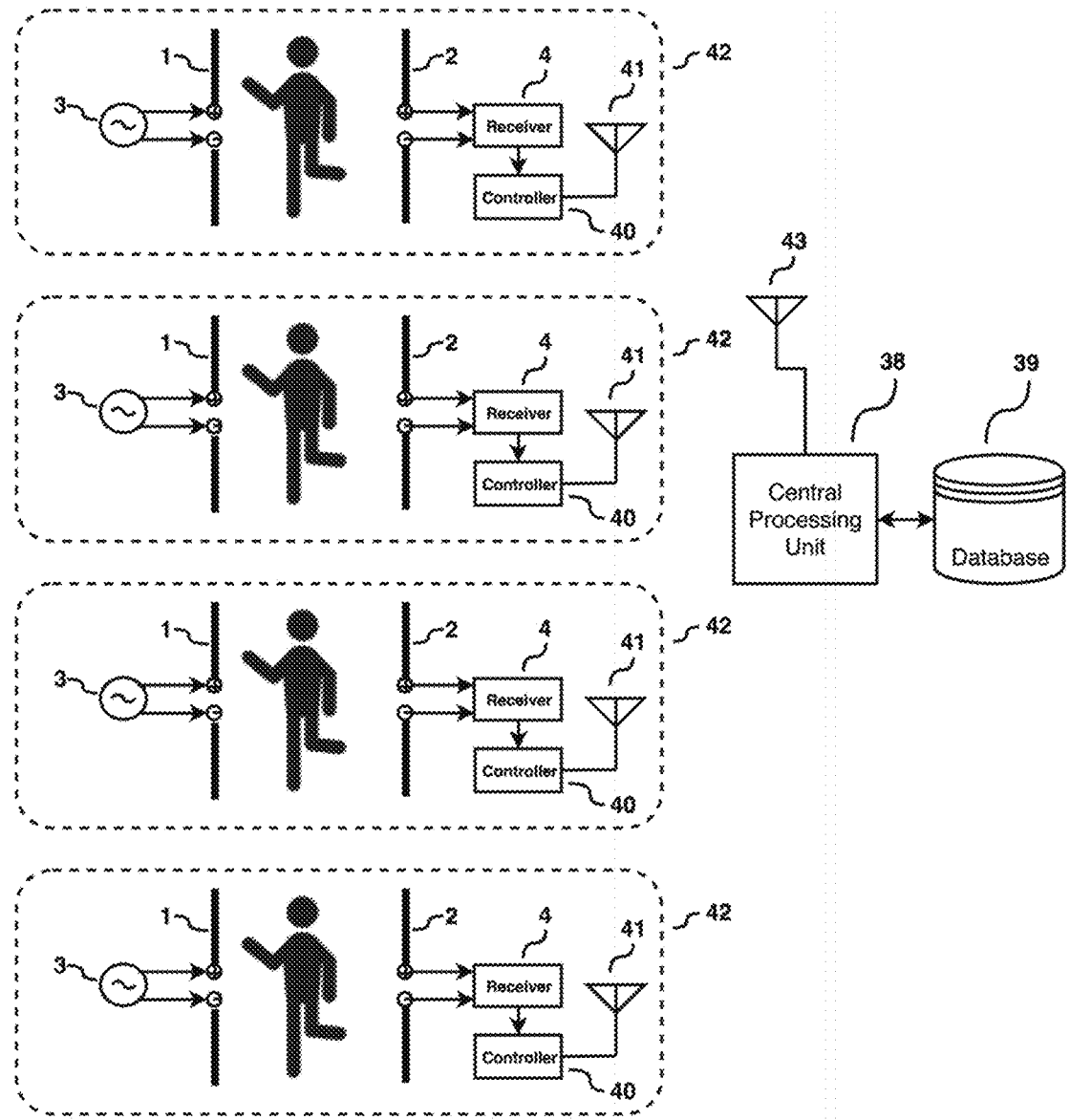
FIG. 10B illustrates a wireless multiple sensor node configuration for the human detector system, according to another embodiment of the present invention.

FIG. 10B illustrates a wireless multiple sensor node configuration for the human detector system, according to another embodiment of the present invention. Particularly, in the wireless configuration, multiple wireless sensor nodes in human detector sub-systems 42 include a transmitter 3 and transmit antenna 1, receiver 4 and receiver antenna 2. Moreover, human detector sub-systems 42 also include an additional antenna 41 for communications. Furthermore, human detector sub-system 42 has a controller 40 configuring each sensor node of human detector sub-systems 42 to operate independently. Subsequently, human detector sub-systems 42 are similar to the human detection system 100 as shown in FIG. 1 and distributed in-building or over a campus area.

In accordance with this embodiment of present invention, the human detector sub-systems 42 have a capability to establish and re-establish the wireless link with the central processing unit 38 when the human detector sub-system 42 is disconnected. Particularly, the distributed network of sensor nodes of human detector sub-system 42 also includes a central processing unit (CPU) 38, a communications antenna 43 for the central processing unit 38 and a database 39. Moreover, the central processing unit 38 collects and processes signature data from all of the sensor nodes 42 and records the data and stores in the database 39. Furthermore, sensor nodes of human detector sub-systems 42 communicate with the central processing unit 38 wirelessly. Henceforth, the wireless communication is via any one of the wireless protocols selected from Wi-Fi, Zigbee, 6LowPAN, Sigfox, LoRaWAN and the like. Henceforth, human detection system 100 is used for detection and identification of human beings over a large area. The aforementioned description is be used to implement the human detection system 100.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention. The present invention relates to a procedure for detecting, monitoring and identifying of human beings using radio frequency technology and identification algorithms as they walk, run or move through a passageway, walkway or doorway and enter or leave an enclosed large surface area such as a room, building or campus. It has been developed for the monitoring and supervision of indoor and outdoor areas and spaces to detect the presence of people and to identify them. The present method can also be used for supervision of various storage areas, supervision of working sites, frontier supervision, passage control in industrial areas, supervision of military areas, airports, etc.

We claim:

1. A human identifier system capable of distinguishing between multiple people, and said human identifier system comprising:

a data processor; and a system of one or more sensor nodes sensing presence of people moving, with each sensor node further comprising:

a first array of antennas and a second array of antennas comprising one or more antenna pairs and said one or more antenna pairs further comprising:

a first antenna and a second antenna, wherein said first antenna is located at a fixed distance from said second antenna forming a passageway for a person to move between the first antenna and second antenna; and a radio frequency transmitter capable of generating a plurality of radio signals;

a radio frequency receiver capable of receiving said plurality of signals; and a first configuring means deployed to connect at least one antenna of said first array to said radio frequency transmitter and a second configuring means to connect at least one antenna of said second array to said radio frequency receiver, wherein said first configuring means and said second configuring means are any one of a switching means, a combining means, a splitting means, a coupling means, a multiplexing means, and a through-line;

wherein said data processor is operably connected to said radio frequency receiver of each sensor node and has a processing means for processing a plurality of received signals from said radio frequency receiver to provide a plurality of output signals that identify the person moving between said first antenna and said second antenna of said at least one antenna pair, wherein said system of sensor nodes is operably connected to a central processing unit, wherein each antenna pair is separated from a neighboring antenna pair by a distance such that the person's walk-cycle is captured, wherein said central processing unit further comprises a processing means for processing a plurality of received signals from said plurality of sensor nodes to provide said plurality of output signals, wherein said system is capable of distinguishing between said multiple people by:

retrieving a plurality of data processor records of said plurality of received signals resulting from an unknown person moving between said first antenna and said second antenna; and said processing means is configured to execute a set of instructions to run an identification algorithm to compare said plurality of received signals with a plurality of identification signatures stored in a database; and storing back said plurality of data processor records in said database.

2. The human identifier system of claim 1, wherein said first antenna pair forms a first array, and said second antenna forms a second array, wherein said second array is parallel to said first array.

3. The human identifier system of claim 1, wherein said system further comprises said database and said data processor is operably connected to said database and stores the identification signature of said person in said database.

4. The human identifier system of claim 1, wherein said radio frequency receiver and said radio frequency transmitter are configured to synchronize a plurality of transmitter frequencies and a plurality of receiver frequencies to operate at selected same frequencies simultaneously.

5. The human identifier system of claim 2, wherein said second antenna is positioned at a fixed distance from said first antenna, and distance between said first antenna and said second antenna is selected to allow said person to move between them.

6. The human identifier system of claim 5, wherein said first antenna and said second antenna are any one selected from a dipole, a loop, and a helix.

7. The human identifier system of claim 6, wherein said first antenna and said second antenna further comprises a reflector.

8. The human identifier system of claim 1, wherein said identification algorithm is a machine learning algorithm.

9. The human identifier system of claim 8, wherein said machine learning algorithm is based on an artificial neural network, logistic regression, or support vector classifier.

10. A human identifier system capable of distinguishing between multiple people, and the human identifier system comprising:

a data processor; and a system of one or more sensor nodes sensing presence of people moving, with each sensor node further comprising:

a first array of antennas and a second array of antennas comprising one or more antenna pairs and the one or more antenna pairs further comprising:

a first antenna and a second antenna, wherein the first antenna is located at a fixed distance from the second antenna; and the second antenna operably selecting distance from the first antenna;

a radio frequency transmitter capable of generating a plurality of radio signals; and a radio frequency receiver capable of receiving the plurality of signals, wherein at least one antenna of the first array is connected to the radio frequency transmitter and at least one antenna of the second array is connected to the radio frequency receiver, and wherein the data processor is operably connected to the radio frequency receiver of each sensor node and processes a plurality of received signals from the radio frequency receiver to provide a plurality of output signals that identify a person moving between the first antenna and the second antenna of the at least one antenna pair, wherein to process the plurality of received signals from the radio frequency receiver, the data processor is to:

measure, based on the plurality of received signals from the radio frequency receiver, a plurality of signatures of body movements of a detected human passing through the system, the plurality of signatures measured as a time series at a plurality of frequencies from $f_1$ to $f_N$ of at least one human passing through the system;

normalize magnitudes of the plurality of signatures by dividing each value of the plurality of signatures by an ambient or quiescent value when no human is passing through said system;

arrange the plurality of signatures into a single array to form and generate a dataframe and align the plurality of signatures to start and stop at the same time with respect to a reference dataframe;

align the plurality of signatures according to a minimum value in one of the plurality of signatures; and store the normalized and aligned plurality of signatures as a dataframe, wherein, the signature having the minimum has a slowest variation.

* * * * *